(12) United States Patent
Webb et al.

(10) Patent No.: US 11,039,213 B2
(45) Date of Patent: *Jun. 15, 2021

(54) MEDIA CONTENT RIGHTS NEGOTIATION BASED ON A PROTOCOL FOR MANAGEMENT OF MEDIA CONTENT RIGHTS USING A DISTRIBUTED MEDIA RIGHTS TRANSACTION LEDGER

(71) Applicant: Turner Broadcasting Systems, Inc., Atlanta, GA (US)

(72) Inventors: Nicolas Paul Webb, McDonough, GA (US); Nishith Kumar Sinha, Mableton, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/246,249

(22) Filed: Jan. 11, 2019

(65) Prior Publication Data

US 2019/0215565 A1   Jul. 11, 2019

Related U.S. Application Data

(60) Provisional application No. 62/616,216, filed on Jan. 11, 2018.

(51) Int. Cl.
*H04L 29/06* (2006.01)
*H04N 21/4627* (2011.01)
(Continued)

(52) U.S. Cl.
CPC ..... *H04N 21/4627* (2013.01); *G06F 16/1824* (2019.01); *G06F 21/105* (2013.01);
(Continued)

(58) Field of Classification Search
CPC .......... H04N 21/4627; H04N 21/2347; H04N 21/44222; H04N 21/4622;
(Continued)

(56) References Cited

U.S. PATENT DOCUMENTS

| 7,290,699 B2 * | 11/2007 | Reddy ............... G06F 21/10 235/375 |
| 8,639,625 B1 | 1/2014 | Ginter et al. |

(Continued)

OTHER PUBLICATIONS

Coutinho et al., "Service-based negotiation for advanced collaboration in enterprise networks," Jan. 2014, Springer Science+ Business Media New York 2014 (Year: 2014).*

(Continued)

*Primary Examiner* — Eleni A Shiferaw
*Assistant Examiner* — Stephanie S Ham
(74) *Attorney, Agent, or Firm* — Chip Law Group

(57) ABSTRACT

Provided are a system and method for media content rights negotiation based on defined protocol for management of media content rights using distributed media rights transaction ledger. An initiating node determines acquisition requirement and/or receive request on behalf of other participant for media content rights of requested media content and traverses associated instance of distributed media rights transaction ledger to identify receiving entity node that has media content rights available for negotiation. Accordingly, initial media content rights negotiation transaction is issued, which includes offer for corresponding media content rights. The receiving entity node verifies an identity and signature of initiating entity from initial media content rights negotiation transaction, issues new media content rights negotiation transaction based on verification, evaluation, and/or acceptance of offer. Each instance of distributed media rights transaction ledger includes at least initial media content (Continued)

rights negotiation transaction and new media content rights negotiation transaction.

43 Claims, 10 Drawing Sheets

(51) Int. Cl.

| | |
|---|---|
| *H04N 21/8352* | (2011.01) |
| *H04L 9/06* | (2006.01) |
| *G06F 16/182* | (2019.01) |
| *G06F 21/10* | (2013.01) |
| *G06F 21/64* | (2013.01) |
| *H04L 9/08* | (2006.01) |
| *H04L 9/32* | (2006.01) |
| *H04L 29/08* | (2006.01) |
| *H04N 21/2347* | (2011.01) |
| *H04N 21/442* | (2011.01) |
| *H04N 21/462* | (2011.01) |
| *H04N 21/472* | (2011.01) |

(52) U.S. Cl.
CPC ............ *G06F 21/64* (2013.01); *H04L 9/0643* (2013.01); *H04L 9/0825* (2013.01); *H04L 9/0861* (2013.01); *H04L 9/3236* (2013.01); *H04L 9/3247* (2013.01); *H04L 63/126* (2013.01); *H04L 67/10* (2013.01); *H04L 69/24* (2013.01); *H04N 21/2347* (2013.01); *H04N 21/44222* (2013.01); *H04N 21/4622* (2013.01); *H04N 21/47202* (2013.01); *H04N 21/8352* (2013.01); *H04L 2209/603* (2013.01); *H04L 2463/101* (2013.01)

(58) Field of Classification Search
CPC .......... H04N 21/47202; H04N 21/8352; G06F 16/1824; G06F 21/105; G06F 21/64; H04L 9/0861; H04L 9/3236; H04L 9/3247; H04L 63/126; H04L 67/10; H04L 69/24; H04L 9/0643; H04L 9/0825
See application file for complete search history.

(56) References Cited

U.S. PATENT DOCUMENTS

| | | | | |
|---|---|---|---|---|
| 8,706,610 | B2* | 4/2014 | Fenichel | G06Q 40/04 |
| | | | | 705/37 |
| 9,100,814 | B2* | 8/2015 | Kjellberg | H04W 8/24 |
| 9,342,661 | B2* | 5/2016 | Cholas | G06Q 30/0633 |
| 9,596,513 | B2* | 3/2017 | Narasimhan | H04H 60/73 |
| 2005/0049886 | A1* | 3/2005 | Grannan | G06Q 30/06 |
| | | | | 705/58 |
| 2008/0092181 | A1 | 4/2008 | Britt | |
| 2011/0184871 | A1* | 7/2011 | Stahl | G06Q 10/06 |
| | | | | 705/310 |
| 2014/0067596 | A1* | 3/2014 | McGovern | G06Q 30/0246 |
| | | | | 705/26.7 |
| 2014/0165209 | A1 | 6/2014 | Yin | |
| 2015/0370909 | A1* | 12/2015 | Volach | G06Q 30/0631 |
| | | | | 707/722 |
| 2016/0321434 | A1 | 11/2016 | McCoy et al. | |
| 2017/0278186 | A1* | 9/2017 | Creighton, IV | G06Q 20/401 |
| 2019/0028278 | A1* | 1/2019 | Gilson | G06F 12/1408 |

OTHER PUBLICATIONS

Notice of Allowance for U.S. Appl. No. 16/246,160 dated Mar. 5, 2020.
Non-Final Office Action for U.S. Appl. No. 16/848,219 dated Apr. 5, 2021.

* cited by examiner

MEDIA CONTENT RIGHTS NEGOTIATION BASED ON A PROTOCOL FOR MANAGEMENT OF MEDIA CONTENT RIGHTS USING A DISTRIBUTED MEDIA RIGHTS TRANSACTION LEDGER

CROSS-REFERENCE TO RELATED APPLICATIONS/INCORPORATION BY REFERENCE

This patent application makes reference to, and claims priority to U.S. Provisional Application Ser. No. 62/616,216, filed on Jan. 11, 2018.

This application also make reference to:
U.S. application Ser. No. 16/245,374, filed on Jan. 11, 2019; and
U.S. application Ser. No. 16/246,160, filed on Jan. 11, 2019.

The above-referenced patent application is hereby incorporated herein by reference in its entirety.

FIELD OF TECHNOLOGY

Certain embodiments of the disclosure relate to a media content rights management system for digital media and television content. More specifically, certain embodiments of the disclosure relate to media content rights negotiation based on a protocol for management of media content rights using a distributed media rights transaction ledger.

BACKGROUND

Advancements in the field of digital media industry, digital media content rights management, and television and broadcasting sector have led to development of various technologies and broadcasting platforms that are revolutionizing the way consumer devices access and consume media content. Usually, broadcasting platforms refer to the types of networks that are used to deliver the media content to the consumers. Currently, all the broadcasting platforms, such as analog terrestrial broadcast, digital terrestrial broadcast, direct-to-home satellite broadcast, cable, Internet Protocol (IP), and over-the-top television (OTT), compete and strive to increase their appeal in order to gain wider audience.

The television viewing market is no longer exclusively concerned with whether media content services are viewed on a dedicated television or another device capable of playing media content. As a result of penetration of new technologies in the television and broadcasting sector, it is evident that the future success of television broadcasting will be dependent on the ability of a network provider to simplify access to the content that consumers demand.

Increased competition has led the broadcast providers, the media content owners, and the media content re-distributors to handle multiple channels, associated media content rights, and modes of delivery at the same time, which in turn have added unparalleled levels of complexity. This requires installation of large infrastructures and resources to maintain uninterrupted content delivery for existing channel and also meet the ever-increasing demand of new channels.

Currently, clearance and negotiations of media content rights are very time consuming and backed by readily inaccessible/unusable data. Further, multiple content libraries by various entities, require separate subscriptions and make it difficult for users to navigate to content of their choice freely without having individual subscription. From content consumer's perspective, there are multiple content libraries available from different service providers that are increasing in number day-by-day, thereby making it difficult for the content consumers to add and manage different subscriptions to consume the content of their choice. Furthermore, third-party measurement of viewership of a media content may be costly, myopic, and often not available for all platforms. There is no mechanism to precisely negotiate media content rights and royalties for various entities. Further, isolated media content catalogs and third-party dependencies to estimate viewership for a media content, such as a TV show, to plan for future advertisement inventory needs and obligations, increase complexities. This in turn increases re-work and requires installation of large infrastructures and resources to maintain uninterrupted media content delivery for existing channels and limits the ability of the broadcaster or distributor to change content and/or provide digital rights management (DRM) licenses for desired media content in real time or near-real time.

Thus, a new and advanced ecosystem may be desirable that may provide dynamic and on-the-fly negotiation of content rights and contractual obligations to provide new and customized media asset offerings in a cost-effective manner and enhanced viewer experience to reinvigorate the digital media and television content broadcasting industry.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for media content rights negotiation based on a protocol for management of media content rights using a distributed media rights transaction ledger, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
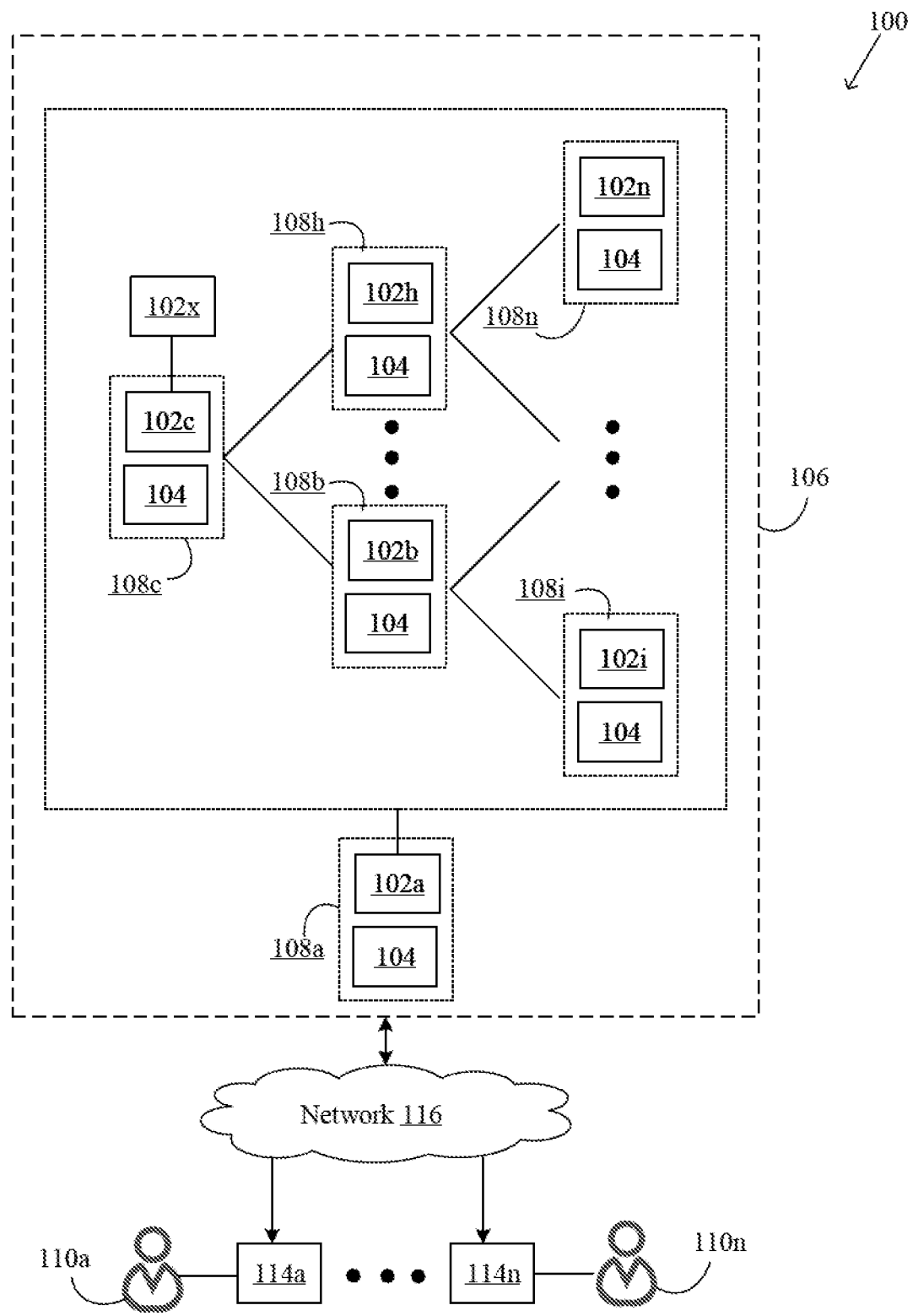
FIG. 1 is a block diagram that illustrates an exemplary system for media content rights negotiation based on a protocol for management of media content rights using a distributed media rights transaction ledger, in accordance with an exemplary embodiment of the disclosure.

Certain embodiments of the disclosure may be found in a method and system for media content rights negotiation based on a protocol for management of media content rights using a distributed media rights transaction ledger. Various embodiments of the disclosure provide a method and system that efficiently controls and secures the acquisition, redistribution, enforcement, tracking, and media content rights negotiation based on a protocol for management of media content rights using a distributed media rights transaction ledger. The disclosed method and system provide a simplified and customized playback and consumption of media content using the distributed media rights transaction ledger in a cost-effective and seamless manner. Various embodiments of the disclosure further provide a mechanism by which the participants, such as the content owners, distributors, and the content consumers, may functionally interact with each other seamlessly and securely to enable simplified, unified, and customized access to the media content that content consumers demand. The disclosed method and system further provide dynamic and on-the-fly negotiation of media content rights, contractual obligations, and preparation of custom catalogs to provide new and customized media asset offerings in a cost-effective manner and enhanced viewer experience to reinvigorate and transform the digital media and television content broadcasting industry.

In accordance with various embodiments of the disclosure, a system is provided for media content rights negotiation based on a protocol for management of media content rights using a distributed media rights transaction ledger. In an embodiment, the system may comprise a plurality of nodes configured to interact with each other in accordance with a defined protocol in a communication network. An initiating node of the plurality of nodes, associated with an initiating entity, may be configured to determine an acquisition requirement and/or receive request on behalf of another participant for media content rights of a requested media content. Based on the determination of the acquisition requirement and/or the received request for the media content rights, an associated instance of a distributed media rights transaction ledger may be traversed to identify a receiving entity node, associated with a receiving entity, that have the media content rights available for negotiation. Accordingly, the initiating entity associated with the initiating node may be configured to issue an initial media content rights negotiation transaction, which includes an offer for corresponding media content rights, with the identified receiving entity node. The identified receiving entity node may be configured to verify an identity and signature of the initiating entity from the initial media content rights negotiation transaction. The identified receiving entity node may be further configured to issue a new media content rights negotiation transaction in response to the initial media content rights negotiation transaction issued by the initiating node based on the verification, evaluation, and/or acceptance of the offer. A plurality of instances of the distributed media rights transaction ledger may be associated with a respective node of the plurality of nodes. Each instance of the distributed media rights transaction ledger may include at least the initial media content rights negotiation transaction and the new media content rights negotiation transaction.

FIG. 1 is a block diagram that illustrates an exemplary system for media content rights negotiation based on a protocol for management of media content rights using a distributed media rights transaction ledger, in accordance with an exemplary embodiment of the disclosure. The operation of FIG. 1 is described herein in conjunction with FIGS. 2A to 2E, which depict exemplary message flows for media content rights negotiation based on a protocol for management of media content rights using a distributed media rights transaction ledger in the ecosystem 100 of FIG. 1, in accordance with an exemplary embodiment of the disclosure.

Referring to FIG. 1, there is shown a network of nodes and participants, hereinafter "ecosystem 100", for dynamic management of media content rights, in accordance with an exemplary embodiment of the disclosure. The ecosystem 100 may comprise a plurality of nodes 102a, . . . , 102n that are communicatively coupled to each other. There is shown a distributed media rights transaction ledger 104 that remains distributed and synchronized with the plurality of nodes 102a, . . . , 102n, in a communication network 106. There is further shown a plurality of participants 108a, . . . , 108n and 110a, . . . , 110n, which may be associated with corresponding nodes from the plurality of nodes 102a, . . . , 102n. One or more nodes from the plurality of nodes 102a, . . . , 102n may be configured to manage a plurality of media content rights negotiation transactions with one or more remaining nodes of the plurality of nodes 102a, . . . , 102n. The plurality of participants 108a, . . . , 108n and 110a, . . . , 110n include a plurality of entities 108a, . . . , 108n and a plurality of content consumers 110a, . . . , 110n. There is further shown a plurality of consumer devices 114a, . . . , 114n associated with respective content consumers of the plurality of content consumers 110a, . . . , 110n. The communication network 106 may be communicatively coupled to the plurality of content consumers 110a, . . . , 110n via a network 116. Although for purposes of description, there is discussed one node, such as an initiating node 102a, and a receiving entity node, such as receiving entity node 102b or 102c, in the exemplary FIG. 1; however, it should not be construed to be limiting and there may exist multiple instances of the initiating node and the receiving entity node in the ecosystem 100, without any deviation from the scope of the disclosure.

The ecosystem 100 may provide an online platform for creation of a digital marketplace where new media markets, such as a content trading markets, may emerge. Such a digital marketplace for media content rights may then be realized based on a defined protocol or a method which defines a standard for the plurality of nodes 102a, . . . , 102n to communicatively couple and interact with each other. The defined protocol may be configured to establish a network of the plurality of nodes 102a, . . . , 102n, and the plurality of participants 108a, . . . , 108n and 110a, . . . , 110n upon which media content rights may be acquired, redistributed, constraints enforced, negotiated, transferred or consumed. Among the plurality of participants 108a, . . . , 108n and 110a, . . . , 110n of the ecosystem 100, a simplified, secured, real-time, and fail-safe tracking of the media content rights is ensured. In accordance with an embodiment, a media content right associated with a media content may be an electronic implementation of a legal contract designed to allow only authorized redistribution of the digital media content and restrict the ways the media content is consumed.

The plurality of nodes 102a, . . . , 102n may correspond to a server or a service that may be configured to execute an implementation of the defined protocol for joining the communication network 106. In accordance with some embodiments, a node of the plurality of nodes 102a, . . . , 102n may be a software application that includes a set of instructions for defining rules for the programmatic implementation of the defined protocol. In accordance with other embodiments, a node of the plurality of nodes 102a, . . . , 102n may be a hardware device in which the software application is executed. The hardware device may be owned by an entity, for example, a gateway, a content owner or a content distributor. The plurality of nodes 102a, . . . , 102n may be further configured to maintain a copy of the distributed media rights transaction ledger 104 and may create, distribute, execute, and validate media content rights negotiation transactions on/from the communication network 106. In accordance with an embodiment, each node of the plurality of nodes 102a, . . . , 102n may be further configured to maintain a corresponding instance of the distributed media rights transaction ledger 104 and communicate the corresponding instance of the distributed media rights transaction ledger 104 to the one or more remaining nodes upon request.

In an exemplary embodiment, a gateway node may correspond to an initiating node 102a configured to initiate a media content rights negotiation transaction. Further, a content owner or a content distributor may correspond to a receiving entity node 102b or 102c, respectively, configured to receive the initiated media content rights negotiation transaction and issue a new media content rights negotiation transaction based on the verification, the evaluation, and/or acceptance of the offer, upon receipt of the initial media content rights negotiation transaction issued by the initiating node 102a.

At least one node of the plurality of nodes 102a, . . . , 102n, such as the receiving entity node 102b or 102c, a verifier node 102n, or a digital rights management (DRM) license node 102x may be configured to verify the one or more media content rights negotiation transactions of the plurality of media content rights negotiation transactions communicated by the one or more remaining nodes of the plurality of nodes 102a, . . . , 102n. In accordance with an embodiment, the verification may be based on verifying the identity and signature of a sender entity, such as an initiating entity associated with the initiating node 102a.

In accordance with an embodiment, the at least one node of the plurality of nodes 102a, . . . , 102n, such as the receiving entity node 102b or 102c, the verifier node 102n, or the DRM license node 102x may be further configured to reject a set of invalid media content rights negotiation transactions from the one or more media content rights negotiation transactions. In accordance with an embodiment, the rejection may be based on the un-verified identity and signature of the initiating entity, such as the initiating entity associated with the initiating node 102a. and/or when an offer from the initiating entity is unsuccessfully validated and/or evaluated.

In accordance with an embodiment, each entity dictates corresponding terms of agreement and/or contractual obligations for the media content owned by a content owner or distributed (or re-distributed) by a content distributor. The media content rights negotiation transactions may occur in a sequence, forming a chain of events. In some embodiments, the negotiations for the media content rights may occur in the communication network 106, where each media content rights negotiation transaction may be broadcasted to the entire communication network 106 (i.e., to all the nodes of the plurality of nodes 102a, . . . , 102n in the communication network 106). In other embodiments, the negotiations for the media content rights may be done mutually, where two or more nodes may communicate by issuing transactions directly to one another instead of broadcasting media content rights negotiation transactions to the entire communication network 106. In this regard, one or more media content rights negotiation transactions may be private transactions between two entities for which private channels may be created via nodes of the plurality of nodes 102a, . . . , 102n to communicate the private transactions between the two nodes associated with different participants. This type of media content rights negotiation transaction may form a sister collection of media content rights negotiation transactions between the two entities. This may prevent excess traffic (distribution and validation of transactions) on the communication network 106 (of other nodes outside of the negotiation) and frees up other nodes to handle core traffic. However, every set of such mutual negotiations ends with one media content rights negotiation transaction on the distributed media rights transaction ledger 104 that dictates an agreement such as a contract or other obligation between two or more entities over media content rights to agreed media content, such as one or more media assets, which may include some or all of the data referenced in the private transactions in a clear or encrypted form.

In accordance with an embodiment, at least one node of the plurality of nodes 102a, . . . , 102n may be further configured to determine (or discover) one or more new nodes which joined the communication network 106 within a defined time period, and communicate information associated with the plurality of nodes 102a, . . . , 102n to the one or more new nodes. Thus, each node may be further configured to communicate media content rights negotiation transactions to other nodes, regardless of whether the media content rights negotiation transactions originate with the node or were communicated to it by other nodes. In this manner, any given media content rights negotiation transaction may be disseminated to all nodes on the communication network 106. The at least one node of the plurality of nodes 102a, . . . , 102n may be further configured to enforce an adherence of the plurality of nodes 102a, . . . , 102n to the protocol by refusing or accepting to communicate with the plurality of nodes 102a, . . . , 102n.

In accordance with an embodiment, a node, such as the initiating node 102a, of the plurality of nodes 102a, . . . , 102n may be configured to act as an electronic gateway or a proxy for a consumer device associated with a content consumer to connect with at least one node of the plurality of nodes 102a, . . . , 102n. In this regard, the node is accessible to consumer devices via an application programming interface (API) which allows the content consumers to interact with the communication network 106. The entity that owns the gateway and acting on behalf of the content consumer, may acquire media content rights and gather metadata surrounding available media content. The purpose of a node proxying a content consumer, such as one of the plurality of content consumers 110a, . . . , 110n, to the communication network 106 allows rapid scaling of the number of content consumers without the need to scale the count or number of nodes.

Such node of the plurality of nodes 102a, . . . , 102n may be further configured to determine an identity of the content consumer from credentials of the content consumer. In accordance with an embodiment, the identity may be derived from a globally unique cryptographic identifier associated with the content consumer. The node may be further configured to determine that the content consumer exists in an alternate data store that is created based on at least a corresponding instance of the distributed media rights transaction ledger 104. The alternate data store may include a set of transactions of the plurality of media content rights negotiation transactions that correspond to records of a plurality of content consumers that joins the communication network as new content consumers. The node may be configured to validate the content consumer based on the existence of the identity of the content consumer in the alternate data store.

In accordance with an embodiment, at least one node may be further configured to enforce a plurality of constraints associated with the one or more media content rights defined in or specified by at least one transaction of the plurality of media content rights negotiation transactions for a participant to acquire, distribute, or consume content associated with the one or more media content rights. In accordance with an embodiment, each node may represent at least one participant on the communication network 106 based on signed transactions originated from the node with a cryptographic signature of corresponding participant.

In accordance with an embodiment, a node of the plurality of nodes 102a, ..., 102n may be responsible and configured to communicate corresponding instance of the distributed media rights transaction ledger 104, to other requesting nodes in the communication network 106. Accordingly, a new node may be configured to share the same distributed media rights transaction ledger history with any or all other nodes as well, which allows auditing an instance of the distributed media rights transaction ledger associated with corresponding node. In other words, each node may append corresponding media content rights negotiation transactions, as well as media content rights negotiation transactions from other nodes in its own instance of the distributed media rights transaction ledger 104.

The distributed media rights transaction ledger 104 may correspond to a consensus of replicated, shared, and synchronized digital data, for example the plurality of media content rights negotiation transactions, geographically spread across multiple sites, countries, or institutions. The distributed media rights transaction ledger 104 has no central administrator or centralized data storage. Data integrity in the distributed media rights transaction ledger 104 may be secured by consensus across the sites in addition to cryptographic techniques.

In accordance with an embodiment, each instance of the distributed media rights transaction ledger 104 may include a plurality of media content rights negotiation transactions corresponding to accepted media content rights negotiation transactions. Further, in accordance with an embodiment, each instance of the distributed media rights transaction ledger 104 may include a plurality of media content rights negotiation transactions corresponding to at least an acquisition of the media content rights by the first participant 108a and/or a content consumer, for example the first content consumer 110a, prior to the consumption of the media content at the first consumer device 114a.

In accordance with an embodiment, the distributed media rights transaction ledger 104 may include records of historical interactions in a time sequence related to flow or movement of media content rights from a content owner to a content distributor, or from a content distributor to another content distributor, or from a content owner or a content distributor to a content consumer in any arbitrary media content rights negotiation transaction. In some embodiments, in addition to media content rights, the distributed media rights transaction ledger 104 may include records of historical interactions in a time sequence of media consumption by content consumer and related data/analytics, content catalog information, and the like.

The communication network 106 may correspond to a collection of nodes, such as the plurality of nodes 102a, ..., 102n, that interact with one another, perform broadcast media content rights negotiation transactions with respect to one another, and maintain a copy of the distributed media rights transaction ledger 104 to act as a common store of data. In accordance with various embodiments, the communication network 106 may be a peer-to peer network, a protocol network, a distributed communication network and/or the like. In accordance with other embodiments, the communication network 106 may comprise one or more of a cable television networks, the Internet, a satellite communication network, a wide area network (WAN), a medium area network (MAN), and a local area network (LAN). Although a communication network 106 is shown in FIG. 1, the disclosure is not limited in this regard; accordingly, other exemplary modes may comprise uni-directional or bi-directional distribution, such as packet-radio or satellite communication.

The plurality of participants 108a, ..., 108n and 110a, ..., 110n, may correspond to a group, an individual, or a company that may operate the plurality of nodes 102a, ..., 102n on the communication network 106. A participant of the plurality of participants 108a, ..., 108n and 110a, ..., 110n, may act as an entity of a plurality of entities 108a, ..., 108n or a content consumer of a plurality of content consumers 110a, ..., 110n. Each participant of the plurality of participants 108a, ..., 108n and 110a, ..., 110n may interact within the communication network 106 by operating at least one node that adheres to the defined protocol within the communication network 106.

Each entity of the plurality of entities 108a, ..., 108n may be configured to interact with the communication network 106 by operating at least one node on the communication network 106 which adheres to the defined protocol. An entity associated with a node of the plurality of nodes 102a, ..., 102n may present metadata of a plurality of content libraries as a unified library. Another entity of the plurality of entities 108a, ..., 108n may represent a content owner, a content distributor, or both. From the content owner, one or more media content rights associated with media content may be originated. The content owners may be responsible for issuing licenses for consumption of the media content by the content consumers. All media content, such as the media assets, may have only one content owner in perpetuity. Media content rights to the media content, such as the media assets, may be acquired, and re-distributed in accordance with the permission of the content owner.

A content distributor of the plurality of entities 108a, ..., 108n may acquire media content rights from another content owner or another content distributor and redistribute the acquired media content rights to other content distributors and gateway nodes. In accordance with an embodiment, the content owner may own a given collection of media content rights to be sold and/or distributed to content distributors and/or content consumers. When a content consumer is interacting with the communication network 106 through a node, which belongs to a given entity in the communication network 106, the content consumer may be considered to be owned by the given entity. Accordingly, the communication network 106 may be secured by ensuring that: a) content consumer transactions adhere to the protocol as enforced by the proxying/gateway node; b) the entity assumes responsibility over transactions requested by the content consumer; and c) another entity may request to validate the identity of a given user from a prior content owner using the distributed media rights transaction ledger 104.

On the other hand, the content consumer of the plurality of content consumers 110a, ..., 110n may be a user or an individual who may acquire media content rights via a gateway on the communication network 106. Accordingly, the content consumer may execute media content rights to acquire media content licenses to consume the media content. The content consumer may not have the capability to redistribute the acquired media content right. In accordance with an embodiment, the content consumer may require an entity (one of the content owner or the content distributor) as a proxy or a gateway to interact with the ecosystem 100 on behalf of the content consumer. Therefore, the content consumer may not be configured to operate any node of the plurality of nodes 102a, ..., 102n. The content consumer of the plurality of content consumers 110a, ..., 110n may be associated with a corresponding consumer device of the plurality of consumer devices 114a, ..., 114n. A given content consumer may be unique across the entire communication network 106, regardless of which entities the content consumer interacts with or belongs to, based, for example, on a subscription or membership.

In accordance with an embodiment, an entity, such as a content owner and/or a content distributor, may serve as a gateway for the plurality of content consumers 110a, ..., 110n and acts on the behalf of the plurality of content consumers 110a, ..., 110n. Further, the entity may acquire the media content rights to distribute the media content that it does not own to other content distributors and/or content consumers. In such a case, the entity may act on the behalf of the plurality of content consumers 110a, ..., 110n. In this regard, when a content consumer is proxied through an entity to the communication network 106, the entity may become an owner of the content consumer.

A plurality of media content rights transactions makes up the core unit (or building block) of data that may be recorded into the distributed media rights transaction ledger 104 of the communication network 106. Each media content rights transaction of the plurality of media content rights transactions may act as a container for exchange of data across nodes among the plurality of nodes 102a, ..., 102n. The structure of each media content rights transaction and corresponding data payload may be specified by the defined protocol for a given context, such that the plurality of nodes 102a, ..., 102n in the communication network 106 may accept, reject, counter, validate, and parse the plurality of media content rights transactions in a deterministic and non-ambiguous manner. The plurality of media content rights negotiation transactions act as a subset of the plurality of media content rights transactions, defining specialized exchange of data regarding the offer, the evaluation of the offer, a counter offer, and/or acceptance of an offer to acquire media content rights. In accordance with an embodiment, in each negotiation of media content rights, there is at least one asking entity, such as the initiating entity, and one accepting entity, such as the receiving entity. The initiating entity initiates the negotiation with the other entities. The receiving entity is an entity that, in an embodiment, has agreed to the terms negotiated and closes the negotiations for the media content rights. For example, the content distributor 102c may want to acquire media content rights to a channel or to a particular media content from the content owner 102b. The content distributor 102c may initiate a media content rights negotiation transaction with a set of parameters for the content owner 102b. In such a case, the content distributor 102c may be the asking entity. In cases, where the content owner 102b agrees to the set of parameters and closes the negotiations for the media content rights, the content owner 102b becomes the accepting entity.

Every set of media content rights negotiation transaction begins with an "INITIATE" media content rights negotiation transaction that may signal the start of a negotiation of media content rights between two or more entities. Each negotiation set only has one "INITIATE" media content rights negotiation transaction. A "COUNTER" media content rights negotiation transaction, hereinafter media content rights negotiation counter transaction, may be done or recorded when an entity has rejected another entity's "ASK" media content rights negotiation and is providing an alternative offer. An "AGREE" media content rights negotiation transaction may occur when an entity has accepted the terms of the last "ASK" media content rights negotiation transaction, hereinafter media content rights negotiation accept transaction. At this point in time, the receiving entity that has accepted the terms of the last "ASK" media content rights negotiation transaction becomes the accepting entity and is responsible for recording the media content rights negotiation negotiations of the media content rights. As per the protocol that dictates the rules of how the participants interact with each other as a standard, there can only be one "AGREE" transaction in a set of media content rights negotiation negotiations, and only at the end of the chain of media content rights negotiation transactions.

In accordance with an embodiment, every media content rights negotiation transaction for the media content rights may include an "ASK" data field. The "ASK" data field may further include one or more parameters governing the constraints of a contract between the participating entities. Such one or more parameters may be dictated by the protocol in definition or type, but not in value. For example, "PRICE" may be parameter defined in the rules of the protocol, but its value is only defined in any given media content rights negotiation transaction and may differ from transaction to transaction. Other parameters of the "ASK" data field may include, but are not limited to "DATE_RANGE", "CONTENT_ID", "GEOGRAPHICAL_PERMIT", "TIME_OF_DAY", and "DURATION." These parameters take on their named literal meaning.

Each media content rights negotiation transaction of the plurality of media content rights negotiation transactions may be created by a node, such as the initiating node 102a, of the plurality of nodes 102a, ..., 102n, and recorded into corresponding instance of the distributed media rights transaction ledger 104, when accepted. Further, the media content rights negotiation transaction of the plurality of media content rights negotiation transactions may be communicated to other nodes to be rejected, countered, dismissed, or validated, and when accepted, may be recorded into corresponding instances of the distributed media rights transaction ledger 104 maintained at respective nodes of the plurality of nodes 102a, ..., 102n. The data traffic created by the plurality of media content rights negotiation transactions between the nodes of the plurality of nodes 102a, ..., 102n, along with all other media content rights transactions between nodes of the plurality of nodes 102a, ..., 102n, is what defines the ecosystem 100 or the marketplace of media content rights. Each of the plurality of media content rights negotiation transactions may be categorized and specified by the defined protocol. Each media content rights transaction may include the category of: a) an announcement of a newly created entity; b) an announcement of a newly created content consumer; c) an announcement of newly available media content, such as a media asset; d) an acquisition of media content rights to media content (as a result of negotiations); and e) consumption of the media content by a content consumer.

In accordance with various embodiments, each of the plurality of media content rights transactions may be configured to define the acquisition and execution of media content rights. Each of the plurality of media content rights transactions may be stored in the distributed media rights transaction ledger 104 to serve as a history of interactions between various entities. Each of the plurality of media content rights transactions originate from a node of the plurality of nodes 102a, . . . , 102n, and must be distributed to all nodes within the communication network 106 for validation and synchronization. Each of the plurality of media content rights transactions, as well as the subset which is the plurality of media content rights negotiation transactions, may comprise an initiating node's entity's cryptographic signature, a recipient entity's cryptographic identity, and identity of one or more media content rights for a given media content, negotiated terms of one or more media content rights, an identity of a content consumer, and disparate data associated with consumption of media content by a content consumer.

Each of the plurality of media content rights negotiation accept transactions may further comprise an encrypted summary of a set of media content rights negotiation transactions, one or more cryptographic hashes of historic media content rights negotiation transactions from the distributed media rights transaction ledger 104 for linking one media content rights negotiation transaction to another, and a cryptographic hash of all data comprising the media content rights negotiation transaction. Each of the plurality of media content rights transactions may further comprise a descriptor for the intent of the media content rights transaction, which may further include at least granted media content rights after a negotiation, transferal of a media content right, and intent to begin a negotiation with another entity, grant of a media content right, consumption of media content by a content consumer, and registration of the plurality of participants 108a, . . . , 108n, and 110a, . . . , 110n.

In accordance with an embodiment, in a case where a media content rights transaction is found to be invalid by most nodes in the communication network 106, the media content rights transaction may be discarded and not appended to the distributed media rights transaction ledger 104 across all nodes of the plurality of nodes 102a, . . . , 102n. There may be an exception, where such invalid media content rights transactions may be added to the distributed media rights transaction ledger 104, but remain invalid, to serve as a history of the origin of invalid media content rights transactions. Such a history may serve as a mechanism to audit potential attacks on the communication network 106 during auditing.

The network 116 may be any kind of network, or a combination of various networks, and it is shown illustrating the communication that may occur between the plurality of consumer devices 114a, . . . , 114n and the distributed communication network 106. For example, the communication network 106 may comprise one or more of a cable television networks, the Internet, a satellite communication network, a wide area network (WAN), a medium area network (MAN), and a local area network (LAN). Although the network 116 is shown, the disclosure is not limited in this regard, accordingly, other exemplary modes may comprise uni-directional or bi-directional distribution, such as packet-radio, satellite.

Figure 2A:
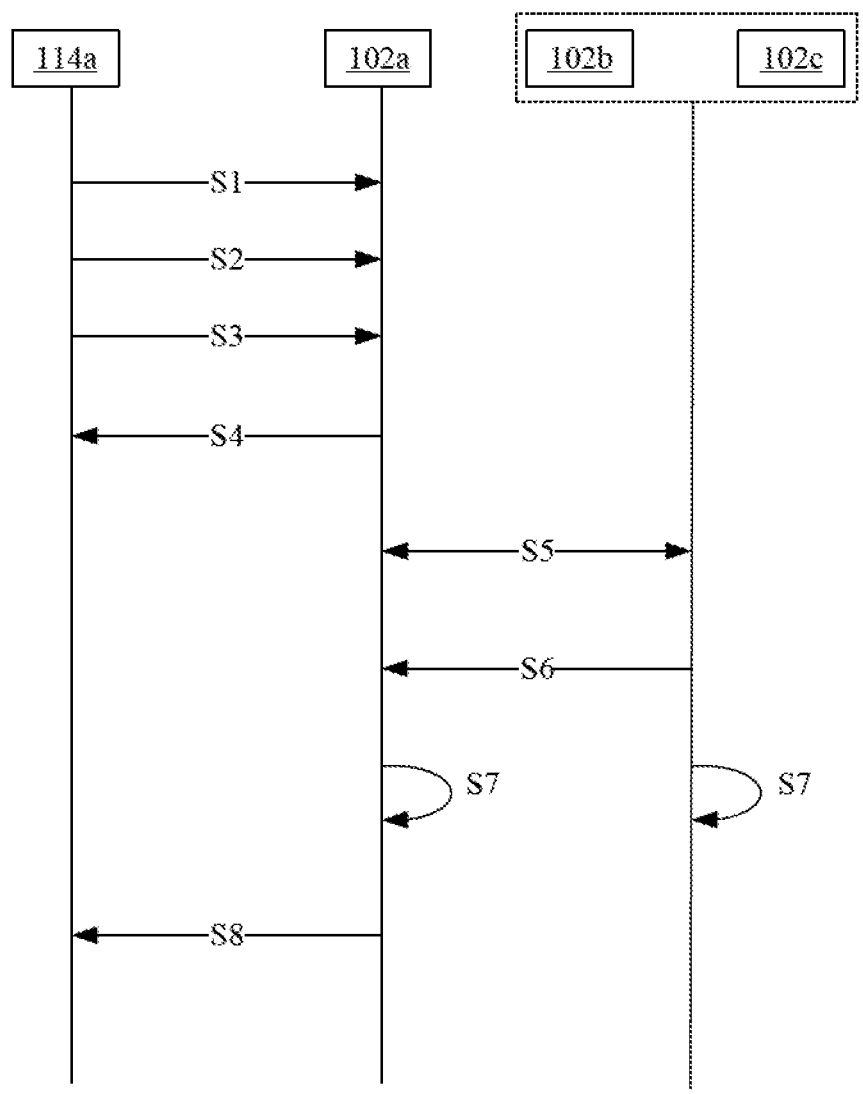
FIGS. 2A to 2E depict message flow diagrams illustrating exemplary message flows for media content rights negotiation based on a protocol for management of media content rights using a distributed media rights transaction ledger in the ecosystem 100 of FIG. 1, in accordance with an exemplary embodiment of the disclosure.

In operation, a node, such as the initiating node 102a, of the plurality of nodes 102a, . . . , 102n may be configured to receive login credentials, such as a username and a password, from the plurality of content consumers 110a, . . . , 110n, as depicted by S1 in FIG. 2A. The login credentials may be received from the plurality of content consumers 110a, . . . , 110n via respective consumer devices, such as the plurality of consumer devices 114a, . . . , 114n. The initiating node 102a may be configured to derive a unique cryptographic identifier, such as a unique string of alphanumeric characters of defined length, from the login credentials of each of the plurality of content consumers 110a, . . . , 110n. The unique cryptographic identifier may be derived based on, for example a hashing algorithm, defined in the protocol defined in the communication network 106, and stored in the alternate data store owned by the initiating node 102a.

In accordance with an embodiment, at a later time, when the first content consumer 110a requests a desired media content for consumption, by providing corresponding login credentials, the initiating node 102a, representing for example a streaming media and VOD service provider, may be configured to determine whether the unique cryptographic identifier of the first content consumer 110a is found in the alternate data store associated with the initiating node 102a. If not found, a validator system, for example another entity representing a direct broadcast satellite service provider, may be checked based on the distributed media rights transaction ledger 104. In accordance with an embodiment, a validator may be found for the unique cryptographic identifier of the first content consumer 110a using the distributed media rights transaction ledger 104. The validator may be found in case the validator system may have previously interacted with the first content consumer 110a, and corresponding content media rights transaction is stored in the distributed media rights transaction ledger 104. In an embodiment, the validator is not found for the unique cryptographic identifier of the first content consumer 110a using the distributed media rights transaction ledger 104, the first content consumer 110a may be invalidated.

In accordance with another embodiment, the initiating node 102a may be configured to validate the first content consumer 110a based on the existence of the unique cryptographic identifier of the first content consumer 110a in the alternate data store of the initiating node 102a. Additionally, the presence of the validator may validate the first content consumer 110a. Accordingly, the initiating node 102a may be configured to receive media content request, corresponding to media content selection, from the first content consumer 110a, via the first consumer device 114a, as depicted by S2 in FIG. 2A.

In accordance with an embodiment, the unified library/custom catalog 214b owned by the initiating node 102a may identify, prepare and present media content on-the-fly specifically for the first content consumer 110a, based on consumer behavior and consumption pattern of the first content consumer 110a, for playback. In accordance with an embodiment, the first content consumer 110a may provide a selection of a new media content via the first consumer device 114a, as depicted by S3 in FIG. 2A, which may or may not be present by the unified library/custom catalog 214b.

In accordance with an embodiment, the initiating node 102a may determine whether the media content rights (associated with selected media content) are available in the unified library/custom catalog 214b owned by the initiating node 102a. In this regard, it may be determined whether the first content consumer 110a or the initiating entity associated with the initiating node 102a have been granted the media content rights associated with the selected media content in the unified library/custom catalog 214b owned by the initiating node 102a. In case the media content rights associated with the selected media content are available at the initiating node 102a, the media content may be selected for consumption/execution of the rights from the unified library/custom catalog 214b and provided to the first content consumer 110a via the first consumer device 114a by the initiating node 102a, as depicted by S4 in FIG. 2A.

In case the first content consumer 110a or the initiating entity associated with the initiating node 102a has not been granted the media content rights associated with the selected media content in the unified library/custom catalog 214b, the initiating node 102a may determine whether the media content rights (associated with selected media content) are available for acquisition with the receiving entity associated with the receiving entity node 102b or 102c. Accordingly, the initiating entity associated with the initiating node 102a may be configured to negotiate with the receiving entity associated with the receiving entity node 102b or 102c, as depicted by S5 in FIG. 2A. The negotiation may be performed for acquisition of the media content rights and based on a plurality of interactions between nodes from plurality of nodes 102a, ..., 102n, in accordance with defined protocol in the communication network 106. The plurality of interactions between nodes from plurality of nodes 102a, ..., 102n may result in the plurality of media content rights negotiation transactions that may be stored in corresponding instances of the distributed media rights transaction ledger 104 maintained by each node of the plurality of nodes 102a, ..., 102n within the communication network 106 for validation and synchronization.

Figure 2B:
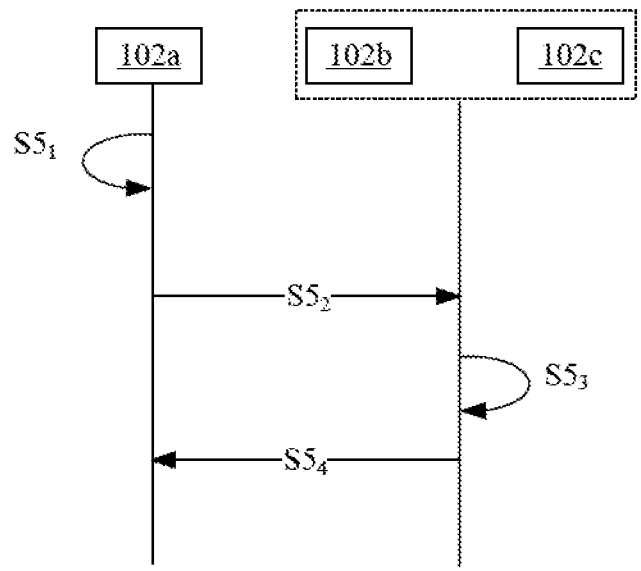

In accordance with an embodiment, the initiating entity associated with the initiating node 102a may be configured to traverse the associated instance of the distributed media rights transaction ledger 104 to identify the receiving entity node 102b or 102c, associated with a receiving entity, that have the media content rights available for negotiation, as indicated by $S5_1$ in FIG. 2B. The initiating entity associated with the initiating node 102a may be further configured to issue the initial media content rights negotiation transaction, which includes the offer for the corresponding media content rights, with the identified receiving entity node 102b or 102c, as indicated by $S5_2$ in FIG. 2B.

In response, the identified receiving entity node 102b or 102c may be configured to verify the identity and signature of the initiating entity from the initial media content rights negotiation transaction, as indicated by $S5_3$ in FIG. 2B.

For the issuance of a new media content rights negotiation transaction, the receiving entity node 102b or 102c associated with the identified receiving entity may be configured to determine the new media content rights negotiation transaction based on the verification, evaluation, and/or acceptance of the offer, upon receipt of the initial media content rights negotiation transaction issued by the initiating node 102a. Accordingly, the receiving entity node 102b or 102c associated with the identified receiving entity may be configured to issue the new media content rights negotiation transaction in response to the initial media content rights negotiation transaction issued by the initiating node 102a based on the verification, evaluation, and/or acceptance of the offer, as indicated by $S5_4$ in FIG. 2B. In accordance with an embodiment, the initiating entity associated with the initiating node 102a determines that the type of the new media content rights negotiation transaction to be a media content rights negotiation accept, reject, or counter transaction.

Figure 2C:
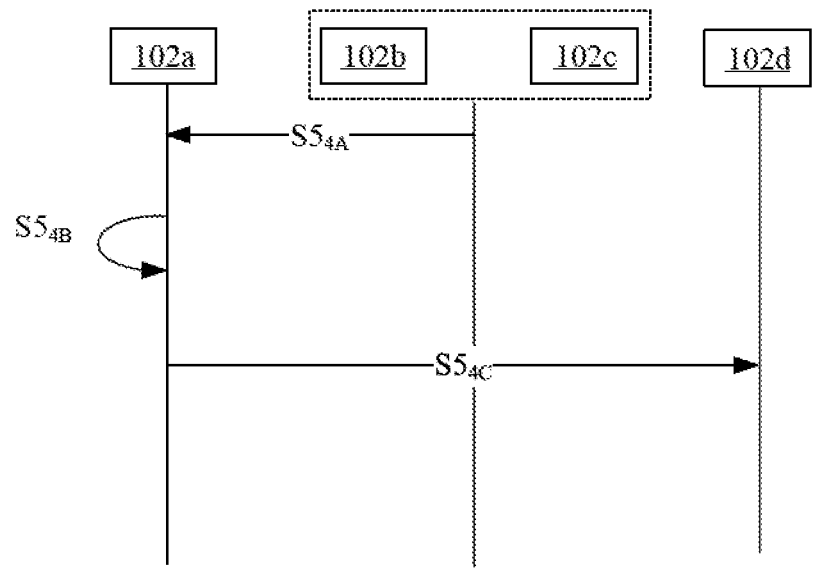

In accordance with an embodiment, as indicated by $S5_{4A}$ in FIG. 2C, the receiving entity node 102b or 102c associated with the identified receiving entity may be configured to issue the media content rights negotiation reject transaction as the new media content rights negotiation transaction to the initiating node 102a associated with the initiating entity. Based on the media content rights negotiation reject transaction issued by the receiving entity node 102b or 102c associated with the identified receiving entity, the initiating node 102a associated with the initiating entity may be configured to cease to negotiate with the receiving entity node 102b or 102c associated with the identified receiving entity for the current session, as indicated by $S5_{4B}$ in FIG. 2C. Further, based on the media content rights negotiation reject transaction issued by the receiving entity node 102b or 102c associated with the identified receiving entity, the initiating node 102a associated with the initiating entity may be configured to initiate to negotiate with nodes, such as 102d, associated with entities other than the initiating entity that have the requested media content rights available for negotiation, as indicated by $S5_{4C}$ in FIG. 2C.

Figure 2D:
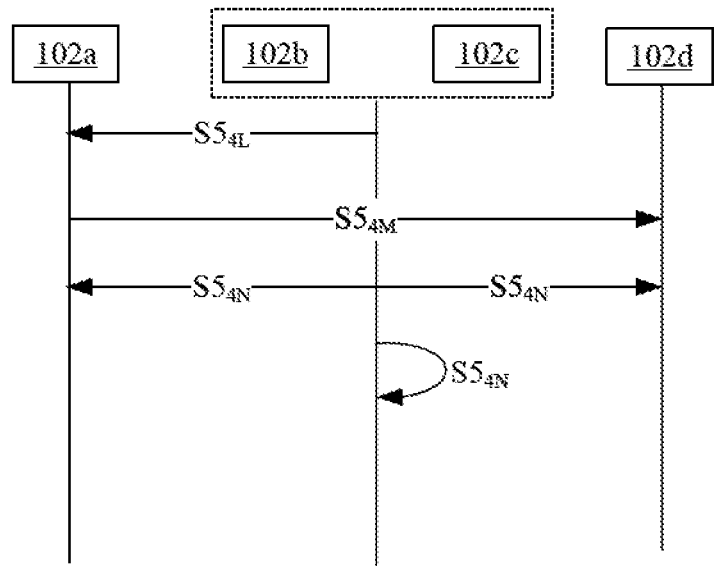

In accordance with another embodiment, the receiving entity node 102b or 102c associated with the identified receiving entity may be configured to issue the media content rights negotiation accept transaction as the new media content rights negotiation transaction to the initiating node 102a associated with the initiating entity, as indicated by $S5_{4L}$ in FIG. 2D. Based on the media content rights negotiation accept transaction issued by the receiving entity node 102b or 102c associated with the identified receiving entity, the initiating node 102a associated with the initiating entity may be configured to issue one or more other media content rights negotiation rejection transactions to one or more nodes, such as 102d, other than the identified receiving entity for current session, as indicated by $S5_{4M}$ in FIG. 2D. Further, based on the media content rights negotiation accept transaction, the receiving entity node 102b or 102c associated with the identified receiving entity may be further configured to broadcast the new media content rights negotiation transaction to the plurality of nodes 102a, ..., 102n in the communication network 106, as indicated by $S5_{4N}$ in FIG. 2D.

Figure 2E:
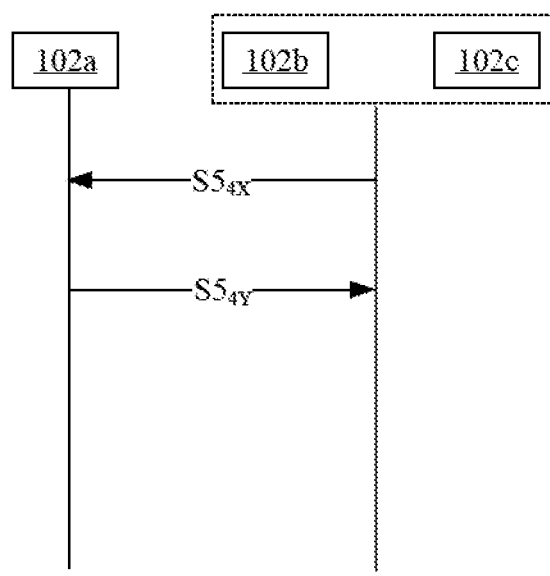

In accordance with an embodiment, the receiving entity node 102b or 102c associated with the identified receiving entity may be further configured to issue the media content rights negotiation counter transaction, which comprises the alternative offer, as the new media content rights negotiation transaction to initiating node 102a associated with the initiating entity, as indicated by $S5_{4X}$ in FIG. 2E. The initiating node 102a associated with the initiating entity may be configured to choose to accept, reject, or counter in response to the media content rights negotiation counter transaction received from the receiving entity node 102b or 102c associated with the identified receiving entity, as indicated by $S5_{4Y}$ in FIG. 2E.

Accordingly, the plurality of media content rights negotiation accept transactions may be appended and stored in corresponding instances of the distributed media rights transaction ledger 104 maintained by each node of the plurality of nodes 102a, ..., 102n within the communication network 106 for validation and synchronization, as indicated by S7 in FIG. 2A. In accordance with an embodiment, each node may cryptographically hash transaction data of each media content rights negotiation accept transaction. This hash is then digitally signed by the initiating entity that initiates media content rights negotiation accept transaction, with a private key of a private key—public key pair. The public key is shared with other nodes whereas the private key is kept as a secret. This allows a node to verify the creator (or the initiator) of the media content rights negotiation accept transaction, and that the media content rights negotiation transaction data is not altered according to the hash digitally signed by the initiating entity. Every single media content rights negotiation accept transaction is verified by checking the distributed media rights transaction ledger 104 distributed at the plurality of nodes 102a, . . . , 102n. Recent validated media content rights negotiation accept transactions may be grouped and cryptographically identified using, for example, but not limited to a hashing algorithm, defined by the protocol. Each group may have a unique cryptographic identifier which is derived from a previous group's final cryptographic identifier, transaction data's cryptographic identifier, and a defined mathematical value. The rules of the protocol may be defined in the genesis group, i.e. the first group. Given the different types of the media content rights negotiation accept transactions, nodes may be configured to derive certain data representing a marketplace, such as the ecosystem 100. The data that is derivable by each node of the plurality of nodes 102a, . . . , 102n may include a global catalog of available content items, a per-entity catalog or an entity level catalogs of available content (based on ownership/distribution rights), and a global user consumption of content items. Such data may create the possibility of inferring the value of media content items based on its demand (user consumption) and its supply (availability versus number of content distributors). An entity may then choose to invoke a negotiation with another entity, or entities, to acquire or distribute the media content rights to a media content item. Since the defined protocol dictates the method in which two or more entities may negotiate, negotiations may then occur dynamically and without premeditated action on behalf of any participating entities in the communication network 106.

The initiating node 102a may be configured to provide the media content rights acquired from the receiving entity node 102b or 102c to the first consumer device 114a, as indicated by S8 in FIG. 2A.

Figure 3:
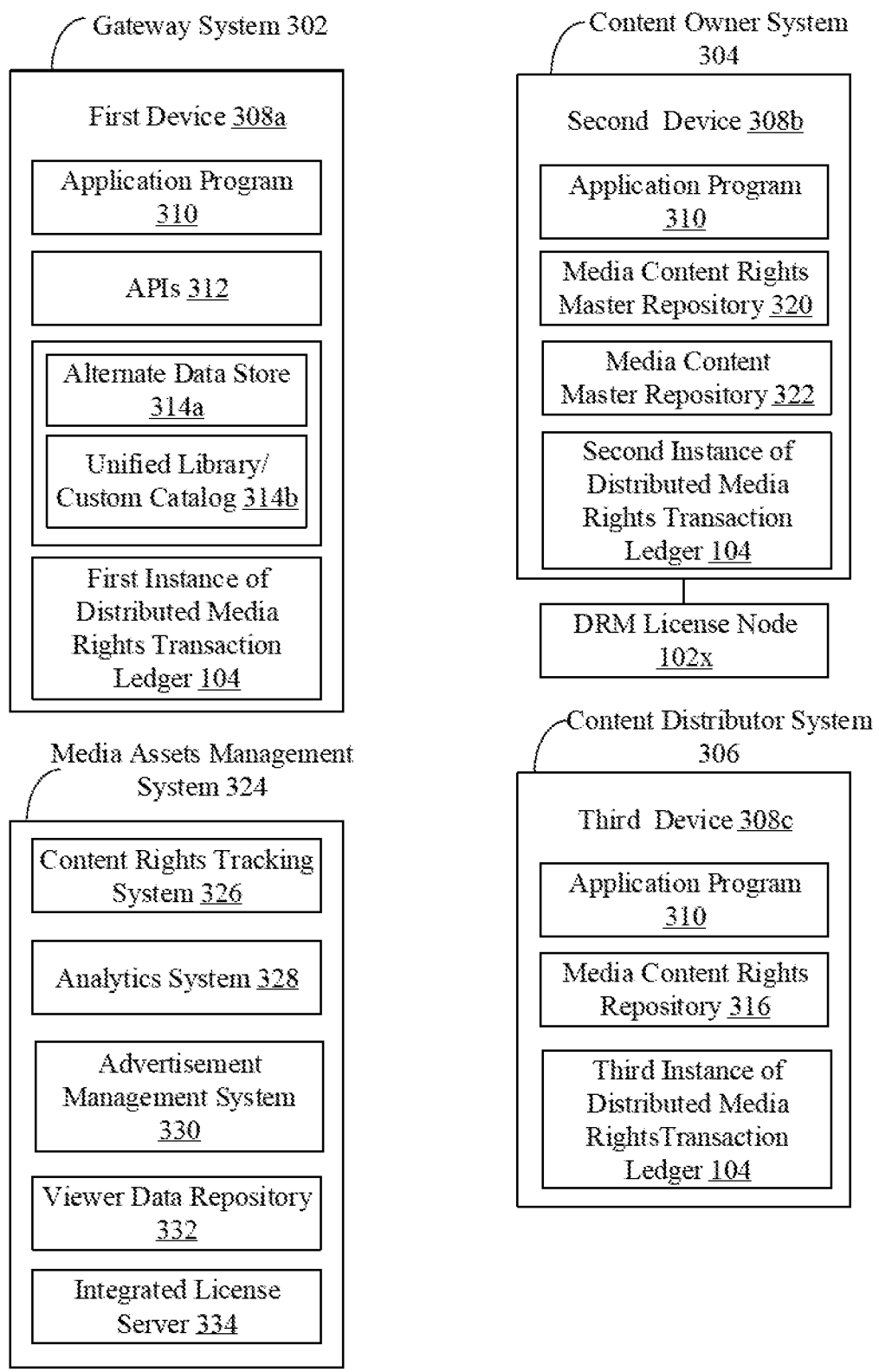
FIG. 3 depicts exemplary block diagrams for various systems of a distributed communication network 106 in the ecosystem 100 of FIG. 1, in accordance with an exemplary embodiment of the disclosure.

FIG. 3 depicts exemplary block diagrams for various systems of a distributed communication network 106 in the ecosystem 100 of FIG. 1, in accordance with an exemplary embodiment of the disclosure. With reference to FIG. 3, there are shown a gateway system 302, a content distributor system 306, a content owner system 304, and a media assets management system 324. The gateway system 302 may correspond to the initiating node 102a of the plurality of nodes 102a, . . . , 102n, belonging to an initiating entity, as described in FIG. 1. Similarly, the content owner system 304 may correspond to the second entity associated with the receiving entity node 102b of the plurality of nodes 102a, . . . , 102n described in FIG. 1. Similarly, the content distributor system 306 may correspond to the third entity associated with the receiving entity node 102c of the plurality of nodes 102a, . . . , 102n described in FIG. 1. The media assets management system 324 may correspond to an arbitrary node of the plurality of nodes 102a, . . . , 102n.

The gateway system 302 may include a first device 308a, an application program 310, APIs 312, an alternate data store 314a, a unified library/custom catalog 314b, and a first instance of distributed media rights transaction ledger 104. The content owner system 304 may include a second device 308b, the application program 310, a media content rights master repository 320, a media content master repository 322, and a third instance of distributed media rights transaction ledger 104. The content owner system 304 is shown to be associated with a DRM license node 102x. The content distributor system 306 may include a third device 308c, the application program 310, a media content rights repository 316, a media content repository 318, and a second instance of distributed media rights transaction ledger 104.

The media assets management system 324 may include a content rights tracking system 326, an analytics system 328, an advertisement management system 330, a viewer data repository 332, and an integrated license server 334. In some embodiments of the disclosure, the content rights tracking system 326, the analytics system 328, the advertisement management system 330, the viewer data repository 332, and the integrated license server 334 may be integrated to form a single integrated system. In other embodiments of the disclosure, the various systems may be distinct. Other separation and/or combination of the various entities of the exemplary media assets management system 324 illustrated in FIG. 3 may be done without departing from the scope of the disclosure.

The gateway system 302 may comprise suitable logic, circuitry, and interfaces that may be configured to execute code that is accessible to the plurality of consumer devices 114a, . . . , 114n via the APIs 312. The APIs 312 allow content consumers 110a, . . . , 110n to interact with the plurality of nodes 102a, . . . , 102n in the communication network 106, with an entity, such as a streaming media and VOD service provider or a direct broadcast satellite service provider, that owns the gateway system 302 acting on behalf of the plurality of consumer devices 114a, . . . , 114n. The interaction may result in acquisition of media content rights for the plurality of consumer devices 114a, . . . , 114n to consume media content and gather metadata associated with available media content.

The first device 308a may be owned by the gateway system 302 (or the initiating node 102a) and configured to store the application program 310, the APIs 312, and the first instance of distributed media rights transaction ledger 104. The first device 308a may be further configured to store or reference the alternate data store 314a and the unified library/custom catalog 314b. The alternate data store 314a may include a plurality of unique identities which may be represented as a cryptographic value corresponding to each valid content consumer. The alternate data store 314a may be created using at least the distributed media rights transaction ledger 104, in which each new content consumer joining the communication network 106 is recorded as a media content rights negotiation transaction. A requesting content consumer is validated in case the identity which may be represented as a cryptographic value of the requesting content consumer is found in the alternate data store 314a based on a match of the identity hash value with one of the plurality of unique identifiers stored in the alternate data store 314a or the first instance of distributed media rights transaction ledger 104.

The gateway system 302 may be configured to present metadata of multiple content libraries that may be owned by different entities, for example, different content owners, distributors, re-distributors, VOD service providers, and the like, as the unified library/custom catalog 314b for the content consumers 110a, . . . , 110n, to navigate. In this regard, the unified library/custom catalog 314b may correspond to a collection of media content belonging to one or more entities having media content rights available for acquisition, distribution, and/or consumption. Further, the unified library/custom catalog 314b may be identified prepared and presented on-the-fly specifically for a content consumer, such as the first content consumer 110a, based on consumer behavior and consumption pattern of the first content consumer 110a, for playback.

Currently due to isolated content libraries and different subscriber base, a narrow view of content consumers related to media consumption pattern is available. The gateway system 302 may solve this problem by presenting metadata of multiple content libraries as the unified library/custom catalog 314b. Based on the communication network 106, an industry-wide network and ecosystem 100 is created, where an industry-wide single sign-on for the content consumers 110a, ..., 110n, may be provided by the gateway system 302 to navigate through an industry-wide shared content library, where media content rights to a media content may be dynamically acquired, distributed, and enforced, by way of media content rights negotiation transactions. Thus, previously untapped markets may be identified, and un-monetized media content may be monetized by dynamic provisioning of media content rights to an accepting entity. In accordance with an embodiment, the gateway system 302 may also include the first instance of the distributed media rights transaction ledger 104, and thus may also function as a node. This node or another node associated with the same entity (e.g., a service provider that controls or owns the gateway system 302) may be required to update corresponding distributed media rights transaction ledger 104, in accordance with the media content rights negotiation transactions proxied for each content consumer (i.e., playback of requested media contents, ad plays, content requests, and the like.) Such update may be broadcasted to other connected nodes of the plurality of nodes 102a, ..., 102n for synchronization of the recently updated media content rights negotiation transaction in the distributed media rights transaction ledger 104 across the plurality of nodes 102a, ..., 102n.

The content owner system 304 may comprise suitable logic, circuitry, and interfaces that may be configured to execute code to own a collection of media content rights to be sold and/or distributed to content distributors, such as the receiving entity node 102b, and/or content consumers, such as the plurality of content consumers 110a, ..., 110n. The content owner system 304 may be further configured to issue licenses to such content consumers for consumption of the media content. As illustrated in FIG. 3, the content owner system 304 may own the second device 308b that may be configured to store the application program 310, the second instance of the distributed media rights transaction ledger 104, the media content rights master repository 320, and the media content master repository 322. The media content master repository 322 may be a database of media content or media assets that are owned by the content owner system 304. The media assets may include uncompressed content, live content segments of one or more live feeds of channels, and/or VOD content. Generally, the term "content," "media," "media assets" and similar words are used interchangeably to refer to any type of media—audio, videos, datacasts, music, text, images, graphics, articles, photos, photo galleries, video galleries, infographics, maps, polls, guest biographies, tweets or other social media, blog posts, and/or the like. The media content rights master repository 320 may be a database of media content rights associated with the media content, available for negotiation. A media content right may be an electronic implementation of a legal contract designed to allow only authorized redistribution of digital media content and restrict the ways the media content is consumed.

The DRM license node 102x may correspond to a DRM license server for media content (that belongs to the content owner system 304) stored in the media content master repository 322. Metadata necessary to acquire a license from the DRM license node 102x associated with the content owner system 304, may include, but is not limited to, a distributed media rights transaction ledger identifier representing a media content, a distributed media rights transaction ledger identifier of an entity (for example the gateway system 302) facilitating the consumption of playback, and a distributed media rights transaction ledger identifier representing a content consumer. Such identifiers may be encrypted and hashed by the entity facilitating the consumption of playback, creating a cryptographic signature which may be used to validate the origin of the request.

The content distributor system 306 may comprise suitable logic, circuitry, and interfaces that may be configured to execute code to acquire media content rights to distribute the media content (that it does not own) to other content distributors and/or content consumers. In accordance with an embodiment, the content distributor system 306 may act on the content consumer's behalf. In accordance with an embodiment, the content distributor system 306 may also act as a content owner, in tandem. As illustrated in FIG. 3, the content distributor system 306 may own the third device 308c that may be configured to store the application program 310, the second instance of the distributed media rights transaction ledger 104, the media content rights repository 316, and the media content repository 318.

The media assets management system 324 may comprise suitable logic, circuitry, and interfaces that may be configured to execute code for being owned or managed by an entity and may operate at least one node of the plurality of nodes 102a, ..., 102n. In some embodiments, the media assets management system 324 may be jointly owned or managed by a group of entities in one country or multiple countries, where each entity operates at least one node of the plurality of nodes 102a, ..., 102n. In some embodiments, the media assets management system 324 may be a public and open system, services of which may be partially or completely available to all the nodes of the plurality of nodes 102a, ..., 102n in the communication network 106.

The content rights tracking system 326 may comprise suitable logic, circuitry, and interfaces that may be configured to execute code for tracking the media content rights or the flow of the media content rights of media content among various participants of the communication network 106 using the distributed media rights transaction ledger 104 maintained at each node. The content rights tracking system 326 increases operational efficiencies in the digital media and television content processing and digital rights management by allowing on-the-fly tracking of the media content rights or the flow of the media content rights of media content among various participants of the communication network 106 using the distributed media rights transaction ledger 104.

The analytics system 328 may comprise suitable logic, circuitry, and interfaces that may be configured to execute code for identifying (on-the-fly) a custom catalog specifically for a content consumer, such as the first content consumer 110a. The analytics system 328 may be further configured to prepare the custom catalog, and make available to the first content consumer 110a, via the gateway system 302. In some embodiments, the analytics system 328 may be configured to communicate the identified custom catalog to a particular node of an entity or a set of nodes of different entities subscribed to services of the analytics system 328. Thereafter, a scheduler system (not shown) of at least one node may be configured to prepare the custom catalog and make available to the first content consumer 110a. Similar to the first content consumer 110a, based on behavior and consumption pattern of the plurality of content consumers 110a, ..., 110n, a custom catalog comprising selected media content, may be identified, prepared, and presented to each of the plurality of content consumers 110a, ..., 110n on respective plurality of consumer devices 114a, ..., 114n for media consumption.

The advertisement management system 330 may comprise suitable logic, circuitry, and interfaces that may be configured to execute code for dynamic insertion of pre-encoded VOD assets, or advertisement media, or other promotional media based on real-time data of media consumption of a particular media asset via the gateway system 302. The real-time data of media consumption may be received when a transaction related to the media consumption of media content is detected for a content consumer. In some embodiments, the advertisement media item (i.e., an ad) may be dynamically inserted at a specified position in the media asset associated with a detected content placement opportunity (CPO). The insertion may be done based on presence of an inbound trigger, such as society of cable telecommunication engineers (SCTE)-104/35-based trigger, at the specified position associated with the detected CPO. The manipulation of the catalogs or programming schedules may be driven by real time or near-real time change in user consumption behavior (that governs demand for particular type of content).

The viewer data repository 332 may comprise suitable logic, circuitry, and interfaces that may be configured to execute code for storing an industry-wide user behavioral data for the digital media and television content industry. The viewer data repository 332 may include individual consumer-based information and aggregate audience-based information. The individual consumer-based information may include parameters, such as favorite media assets, most preferred genre of media assets, most watched TV shows, and other content consumer-specific media preferences. The audience-based parameters may include calculated values derived by processing of media consumption data for a group of content consumers segregated by demographics such as age, region, and the like. The group of content consumers may be associated with respective consumer devices of the plurality of consumer devices 114a, ..., 114n. By use of the viewer data repository 332, content development by an entity, such as content owners, may target a known market with precision. The behavioral data of the content consumers may be shared among the entities, such as the content owners and the content distributors, without involvement of any third-party that currently measures viewership data and sells such data to content owners and distributors at a premium/high cost.

The integrated license server 334 may correspond to an integrated DRM server managed or shared by multiple entities. In some embodiments, content rights of certain media content may be dynamically acquired from the plurality of different content owners using a single integrated license server, such as the integrated license server 334. In some embodiments, each entity, such as a content owner or a content distributor, may have their own DRM server to provide media content rights. Further in some embodiments, media content rights may be dynamically and automatically generated and provided to the asking entity by the integrated license server 334 based on the agreed parameters in a final media content rights negotiation transaction.

FIGS. 4A through 4E depict various flow charts illustrating exemplary operations for media content rights negotiation based on a protocol for management of media content rights using a distributed media rights transaction ledger in the ecosystem 100 of FIG. 1, in accordance with an exemplary embodiment of the disclosure. With reference to FIGS. 4A to 4E, there are shown flowcharts 400A to 400E, described in conjunction with each other.

At 402, login credentials provided by use of an app stored in the first consumer device 114a of the first content consumer 110a may be received. In accordance with an embodiment, a node, such as the initiating node 102a, of the plurality of nodes 102a, ..., 102n may be configured to receive login credentials, such as a username and a password, from the content consumer, such as the first content consumer 110a, via a consumer device, such as a first consumer device 114a. The first consumer device 114a may provide the login credentials by use of an app, for example, a mobile app or a TV app, stored in the first content consumer device 114a.

In accordance with an embodiment, the initiating node 102a may correspond to the gateway system 302, such as the streaming media and VOD service provider. In accordance with an embodiment, the request may be received by the node, such as initiating node 102a, that is accessible to the plurality of consumer devices 114a, ..., 114n, via the APIs 312. The APIs 312 may allow the plurality of content consumers 110a, ..., 110n to interact with the plurality of nodes 102a, ..., 102n in the communication network 106.

In accordance with an embodiment, the content consumer, such as the first content consumer 110a, associated with the first consumer device 114a, may be a participant in the communication network 106 but may not be required to operate a node of the plurality of nodes 102a, ..., 102n.

In accordance with an embodiment, the initiating node 102a may be configured to derive the unique cryptographic identifier, such as a unique string of alphanumeric characters of defined length, from the login credentials of the first content consumer 110a by use of, for example a hashing algorithm, defined in the communication network 106. In accordance with various embodiments, the unique cryptographic identifier may be a public key-private key pair, a unique identifier, or a hash value corresponding to the first content consumer 110a.

The initiating node 102a may further determine whether the unique cryptographic identifier is found in the alternate data store 314a associated with the initiating node 102a. The alternate data store 314a may be created using at least the distributed media rights transaction ledger 104, in which each new content consumer joining the communication network 106 is recorded as a media content rights negotiation transaction. In some embodiments, the unique cryptographic identifier of the first content consumer 110a is found in the alternate data store 314a and control passes to 304.

In other embodiments, when the unique cryptographic identifier of the first content consumer 110a is not found in the alternate data store 314a, a validator system (not shown) may be checked based on the distributed media rights transaction ledger 104. In accordance with an embodiment, the validator systems that may include entities that may have previously interacted with the first content consumer 110a may be checked using the distributed media rights transaction ledger 104. The validator system may request validation of the identity of the first content consumer 110a from a prior owner, for example the direct broadcast satellite service provider, using the distributed media rights transaction ledger 104. When the first content consumer 110a is interacting through the initiating node 102a, which belongs to a given entity, for example the gateway system 302, in the communication network 106, the first content consumer 110a may be considered to be owned by the initiating node 102a. This may secure the communication network 106 by ensuring that: a) first content consumer 110a transactions adhere to the defined protocol as enforced by the proxying node, for example the initiating node 102a; b) the entity, for example the gateway system 302, assumes responsibility over media content rights negotiation transactions requested by the first content consumer 110a; and c) another entity, such as the validator system, may request to validate the identity of the first content consumer 110a from a prior owner, for example another gateway system, using the distributed media rights transaction ledger 104. In such cases, when a validator is found for the unique cryptographic identifier of the first content consumer 110a using the distributed media rights transaction ledger 104, control passes to 304, else the first content consumer 110a is invalidated.

At 404, the first content consumer 110a may be validated. In accordance with an embodiment, the initiating node 102a may be configured to validate the first content consumer 110a based on the existence of the unique cryptographic identifier of the first content consumer 110a in the alternate data store 314a of the initiating node 102a or distributed media rights transaction ledger 104. In accordance with another embodiment, the initiating node 102a may be configured to validate the first content consumer 110a based on a presence of the validator for the unique cryptographic identifier of the first content consumer 110a.

At 406, an acquisition requirement and/or request on behalf of other participant for media content rights of requested media content may be determined. In accordance with an embodiment, the initiating node 102a may be configured to determine the acquisition requirement and/or receive a request on behalf of other participants for media content rights of requested media content. The first content consumer 110a, via the first consumer device 114a, may select the media content to generate the acquisition requirement and/or the request received on behalf of other participant for media content rights of requested media content.

In accordance with an embodiment, the determination of the acquisition requirement and/or the received request for the media content rights may be based on information associated with consumption history of a content consumer or a group of content consumers. The initiating entity associated with the initiating node 102a may retrieve the consumption history from the associated instance of the distributed media rights transaction ledger 104.

In accordance with another embodiment, the determination of the acquisition requirement and/or the received request for the media content rights may be based on information associated with historical media content rights acquisition pricing for a content consumer or a group of content consumers. The initiating entity associated with the initiating node 102a may retrieve information associated with historical content rights acquisition pricing from the associated instance of the distributed media rights transaction ledger 104.

In accordance with another embodiment, the determination of the acquisition requirement and/or the received request for the media content rights may be based on information associated with historical media content rights acquisition pricing for an entity or entities. The initiating entity associated with the initiating node 102a may retrieve the information associated with the historical media content rights acquisition pricing for an entity or entities of the plurality of entities 108a, . . . , 108n from the associated instance of the distributed media rights transaction ledger 104.

In accordance with an embodiment, determination of the acquisition requirement and/or the received request for the media content rights may be based on a predictive model to anticipate demand for the requested media content. The anticipated demand for the media content may be based on one or more criteria. Examples of the one or more criteria may include, but are not limited to, a significant world event, a popularity change of a public figure, a popularity change of a subject matter, cultural influences, social and societal trends, demographics, and/or the release or future release of alternative or related media content.

In accordance with an embodiment, the determination of the acquisition requirement and/or the received request for the media content rights may be based on a statistical analysis of a content consumer or consumers, consumption habits of the content consumer or consumers, and/or historical pricing for at least the content consumers and/or a plurality of initiating and receiving entities.

In accordance with another embodiment, the determination of the acquisition requirement and/or the received request for the media content rights may be based on a playback request for the media content received from at least a subscribed participant, such as the first content consumer 110a, associated with a consumer device, such as the first consumer device 114a, or a presence of the media content in a programming schedule of the initiating node 102a.

In accordance with an embodiment, the first content consumer 110a requests the initiating node 102a of the plurality of nodes 102a, . . . , 102n for the media content from a plurality of media content items. In one case, the plurality of media content items may include a first media content that the initiating node 102a and/or the first content consumer 110a has media content rights to. In another case, the plurality of media content items may include a second media content owned by the second participant 108b associated with the receiving entity node 102b. In such a case, the first participant 108a associated with the initiating node 102a does not have media content rights for redistribution of the second media content. In fact, the second participant 108b has redistribution media content rights, in absence of the media content rights with the first participant 108a or the first content consumer 110a, as further described below. In such case, the receiving entity node 102b of the plurality of nodes 102a, . . . , 102n associated with the second participant 108b, which owns the requested media content, is configured to provide the media content rights associated with the requested media content to the first participant 108a.

Hereinafter, 'the first media content', and 'the second media content' may be referred to as 'the media content'.

At 408, availability of the media content rights associated with the selected media content may be determined in the unified library/custom catalog 314b owned by the initiating node 102a. The unified library/custom catalog 314b may correspond to a collection of media content belonging to one or more entities having media content rights available for acquisition, distribution, and/or consumption. In accordance with an embodiment, first content consumer 110a may provide a selection of a new media content which is not presented by the unified library/custom catalog 314b. For example, the unified library/custom catalog 314b may include media content that is previously purchased by the first content consumer 110a (for example, iTunes®), media content owned the initiating node 102a (for example Netflix®), media content for which the initiating node 102a (for example Netflix®) has rights to redistribute, and media content (for example media content from Disney®) for which the initiating node 102a (for example Netflix®) does not have media content rights.

At 410, it may be determined whether the media content rights (associated with selected media content) are available. In accordance with an embodiment, the initiating node 102a may determine whether the media content rights (associated with selected media content) are available in the unified library/custom catalog 314b owned by the initiating node 102a. In this regard, it may be determined whether the first content consumer 110a or the initiating entity associated with the initiating node 102a have access to the media content rights associated with the selected media content in the unified library/custom catalog 314b owned by the initiating node 102a.

In accordance with an embodiment, the initiating node 102a may determine that the media content rights (associated with selected media content) are available in the unified library/custom catalog 314b. Accordingly, control passes to 412. In accordance with another embodiment, the initiating node 102a may determine that the media content rights (associated with selected media content) are not available in the unified library/custom catalog 314b. Accordingly, the control passes to 414.

At 412, when the media content rights associated with the selected media content are available at the initiating node 102a, the media content rights may be selected from the unified library/custom catalog 314b and provided to the first content consumer 110a by the initiating node 102a for playback/consumption. In this regard, the first content consumer 110a may select the media content from the unified library/custom catalog 314b identified, prepared, and presented by initiating node 102a. The first entity who owns the gateway node, such as the initiating node 102a, may act on behalf of the first content consumer 110a to acquire the media content rights to consume the media content and gather metadata associated with the available media content.

At 414, it may be determined whether the media content rights (associated with selected media content) are available with the second entity or the third entity, collectively referred to as a receiving entity. In accordance with another embodiment, the initiating node 102a may determine that the media content rights (associated with selected media content) are available with the receiving entity, for example the content owner system 304, associated with the receiving entity node 102b or the content distributor system 306, associated with the receiving entity node 102c. Accordingly, control passes to 418. Else, control passes to 416 and the acquisition request may be terminated.

At 418, the media content rights may be negotiated for, based on interaction between the initiating node and the receiving node from the plurality of nodes 102a, . . . , 102n in accordance with defined protocol in the communication network 106. In accordance with an embodiment, the initiating entity associated with the initiating node 102a may be configured to negotiate with the receiving entity associated with the receiving entity node 102b or 102c for acquisition requirement and/or the received request for the media content rights, based on interaction between such nodes from plurality of nodes 102a, . . . , 102n in accordance with defined protocol in the communication network 106.

In accordance with an embodiment, one receiving entity node 102b may directly provide the media content rights to the first content consumer 110a. In accordance with an embodiment, the initiating node 102a may be configured to acquire the media content rights from the receiving entity associated with the receiving entity node 102b (that may directly provide the media content rights) by negotiating with the receiving entity that owns the media content and associated media content rights. In this regard, the first content consumer 110a may consume the media content directly from the receiving entity associated with the one receiving entity node 102b via the initiating node 102a. Thus, the initiating entity associated with the initiating node 102a of the plurality of nodes 102a, . . . , 102n interacting with the corresponding instance of the distributed media rights transaction ledger 104 in the communication network 106, may act on behalf of the first content consumer 110a to acquire one or more media content rights for consumption of the media content by the first consumer device 114a.

In accordance with an embodiment, the media content rights may be dynamically acquired from the receiving entity associated with the other receiving entity node 102c configured to redistribute the media content rights to the first content consumer 110a. In accordance with such embodiment, the initiating node 102a may be configured to dynamically acquire the media content rights from the receiving entity associated with the other receiving entity node 102c (that may redistribute the media content rights to the first content consumer 110a) by negotiating with the receiving entity associated with the other receiving entity node 102c that has the media content rights to redistribute. In accordance with an embodiment, the initiating entity associated with the initiating node 102a may be configured to acquire the media content rights from the receiving entity associated with the other receiving entity node 102c when the first content consumer 110a or the initiating entity associated with the initiating node 102a do not have an access of media content rights associated with the selected media content. In such an embodiment, receiving entity (such as a content distributor) associated with the other receiving entity node 102c may have media content rights to distribute (or redistribute) the media content, previously acquired from another entity (such as a content owner) associated with the receiving entity node 102b. Thus, the initiating entity associated with the initiating node 102a of the plurality of nodes 102a, . . . , 102n interacts with the corresponding instance of the distributed media rights transaction ledger 104 in the communication network 106, may act on behalf of the first content consumer 110a to acquire one or more media content rights for consumption of the media content by the first consumer device 114a.

As described in FIG. 1, the initiating node 102a of the plurality of nodes 102a, . . . , 102n may be associated with a gateway node and the receiving entity node 102b or 102c may be associated with a content owner or a content distributor, respectively. In accordance with an embodiment, the initiating node 102a may be configured to create at least one media content rights negotiation transaction with one or more nodes, such as the receiving entity node 102b or 102c of the plurality of nodes 102a, . . . , 102n. The one or more nodes may further cryptographically secure transaction data of the at least one media content rights negotiation transaction, which is stored in corresponding instance of the distributed media rights transaction ledger 104. In accordance with an embodiment, the one or more nodes may digitally sign the hash transaction data with a private key of a private key—public key pair, and share a public key of the private key—public key pair with remaining nodes of the plurality of nodes 102a, . . . , 102n and maintains the private key as a secret key.

The one or more media content rights negotiation transactions may comprise at least one of a cryptographic signature of an originating entity associated with a corresponding node, another cryptographic signature of a recipient entity, identities of the one or more media content rights for a specific media content, negotiated terms of the one or more media content rights, identities of one or more participants, disparate live media output stream for consumption by a content consumer and/or pre-encoded media asset, a descriptor for an intent of a transaction, an encrypted summary of a set of transactions, one or more cryptographic signatures of historic transactions from the distributed media rights transaction ledger to link at least two transactions, and a cryptographic hash of transaction data. In accordance with an embodiment, an invalid transaction may be added to the distributed media rights transaction ledger 104, remains invalid, and serves as a historical record of origin of invalid transactions.

In accordance with an embodiment, the initiating entity may be configured to manage at least one media content rights negotiation transaction of a plurality of media content rights negotiation transactions with receiving entities. The plurality of media content rights negotiation transactions may be managed by the plurality of entities in accordance with the defined protocol in the communication network 106.

In accordance with an embodiment, the plurality of media content rights negotiation transactions may originate from a node, for example the initiating node 102a of the plurality of nodes 102a, . . . , 102n, and facilitate exchange of data with one or more nodes, such as the receiving entity node 102b or 102c, in the communication network 106. Control passes to 424 in flowchart 400B in FIG. 4B.

At 424, based on the determination of the acquisition requirement and/or the received request for the media content rights, an associated instance of the distributed media rights transaction ledger 104 to identify the receiving entity node 102b or 102c, associated with the receiving entity, that has the media content rights available for negotiation may be traversed. In accordance with an embodiment, the initiating entity associated with the initiating node 102a may be configured to traverse the associated instance of the distributed media rights transaction ledger 104 to identify the receiving entity node 102b or 102c, associated with a receiving entity, that have the media content rights available for negotiation. The traversal may be based on the determination of the acquisition requirement and/or the received request for the media content rights.

At 426, an initial media content rights negotiation transaction may be issued, which includes an offer for corresponding media content rights, with the identified receiving entity node 102b or 102c. In accordance with an embodiment, the initiating entity associated with the initiating node 102a may be configured to issue the initial media content rights negotiation transaction, which includes the offer for the corresponding media content rights, with the identified receiving entity node 102b or 102c.

In accordance with an embodiment, the initial media content rights negotiation transaction may include an identity of the initiating entity, an identity of at least the receiving entity, one or more attributes of the media content rights corresponding to the acquisition requirement and/or the received request for the requested media content, an identity of the requested media content, and a transaction type of the initial media content rights negotiation transaction.

In accordance with an embodiment, the offer for the corresponding media content rights included in the initial media content rights negotiation transaction and one or more counter media rights negotiation transactions may be comprised of one or more of a monetary value, a trade for existing media content rights, and/or statistical data to be used for the evaluation of the offer by the identified receiving entity In accordance with an embodiment, the initial media content rights negotiation transaction and the one or more counter media rights negotiation transactions between the plurality of nodes 102a, . . . , 102n associated with the initiating entity or the receiving entity may not be broadcasted to remaining nodes of the plurality of nodes 102a, . . . , 102n in the communication network 106.

In accordance with another embodiment, the initial media content rights negotiation transaction and the one or more counter media rights negotiation transactions between the plurality of nodes 102a, . . . , 102n associated with the initiating entity or the receiving entity may be re-broadcasted to defined nodes associated with the identified initiating entity or the receiving entity to maintain synchronization.

At 428, an identity and a signature of the initiating entity from the initial media content rights negotiation transaction may be verified. In accordance with an embodiment, identified receiving entity node 102b or 102c may be configured to verify the identity and signature of the initiating entity from the initial media content rights negotiation transaction.

At 430, a new media content rights negotiation transaction may be determined based on verification, evaluation, and/or acceptance of the offer, upon receipt of the initial media content rights negotiation transaction issued by the initiating node 102a. In accordance with an embodiment, for the issuance of the new media content rights negotiation transaction, a receiving entity node 102b or 102c associated with the identified receiving entity may be configured to determine the new media content rights negotiation transaction based on the verification, evaluation, and/or acceptance of the offer, upon receipt of the initial media content rights negotiation transaction issued by the initiating node 102a.

At 432, the new media content rights negotiation transaction may be issued in response to the initial media content rights negotiation transaction issued by the initiating node 102a based on the verification, evaluation, and/or acceptance of the offer. In accordance with an embodiment, the receiving entity associated with the receiving entity node 102b or 102c may be configured to issue the new media content rights negotiation transaction in response to the initial media content rights negotiation transaction issued by the initiating node 102a based on the verification, evaluation, and/or acceptance of the offer.

At 434, a type of the new media content rights negotiation transaction may be checked. In accordance with an embodiment, when the initiating entity associated with the initiating node 102a determines that the type of the new media content rights negotiation transaction to be a media content rights negotiation reject transaction, control passes to 436 in flowchart 400C in FIG. 4C. In accordance with another embodiment, when the initiating entity associated with the initiating node 102a determines that the type of the new media content rights negotiation transaction to be a media content rights negotiation accept transaction, control passes to 442 in flowchart 400D in FIG. 4D. In accordance with yet another embodiment, when the initiating entity associated with the initiating node 102a determines that the type of the new media content rights negotiation transaction to be a media content rights negotiation counter transaction, control passes to 448 in flowchart 400E in FIG. 4E.

Figure 4A:
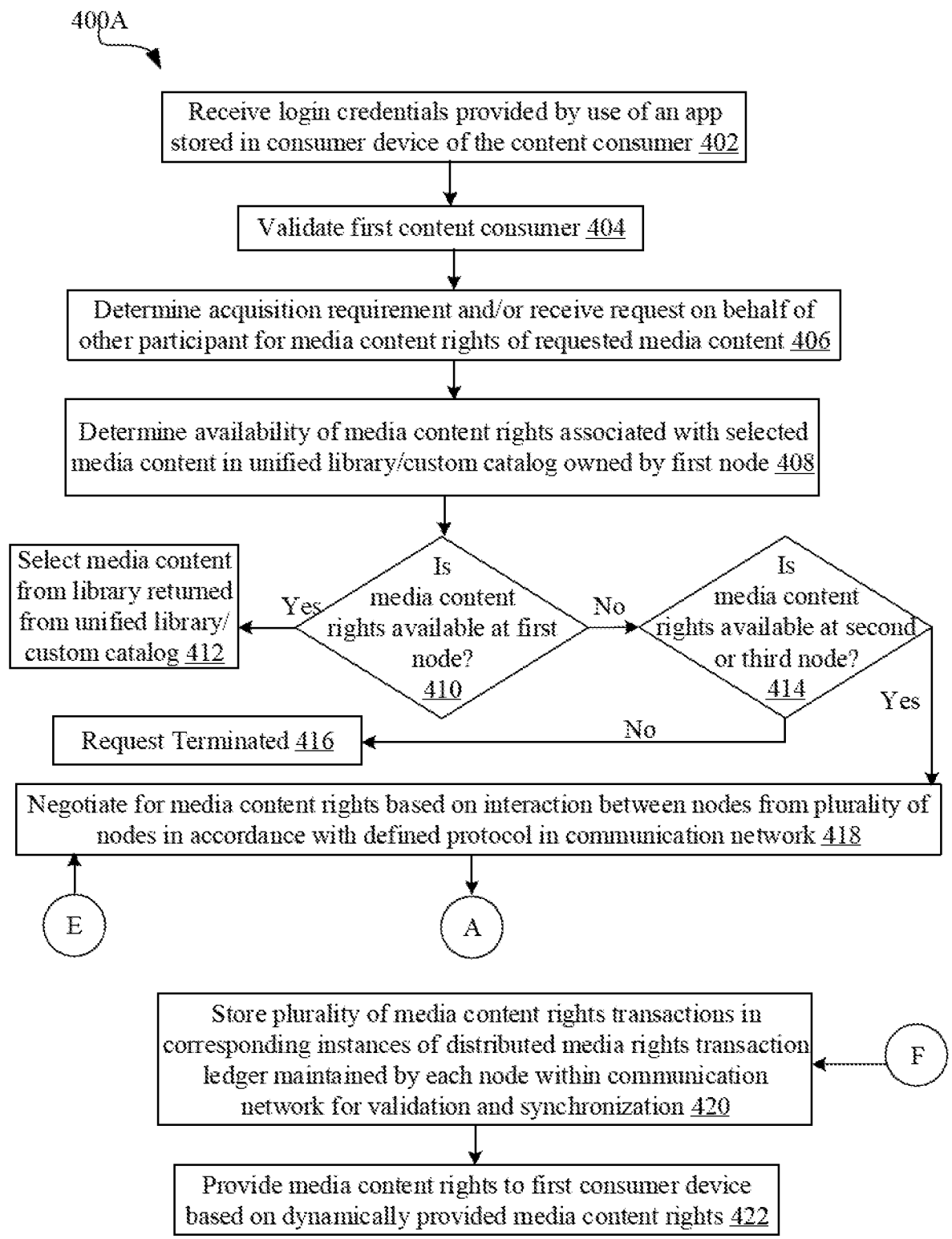
FIGS. 4A through 4E depict various flow charts illustrating exemplary operations for media content rights negotiation based on a protocol for management of media content rights using a distributed media rights transaction ledger in the ecosystem 100 of FIG. 1, in accordance with an exemplary embodiment of the disclosure.
Figure 4B:
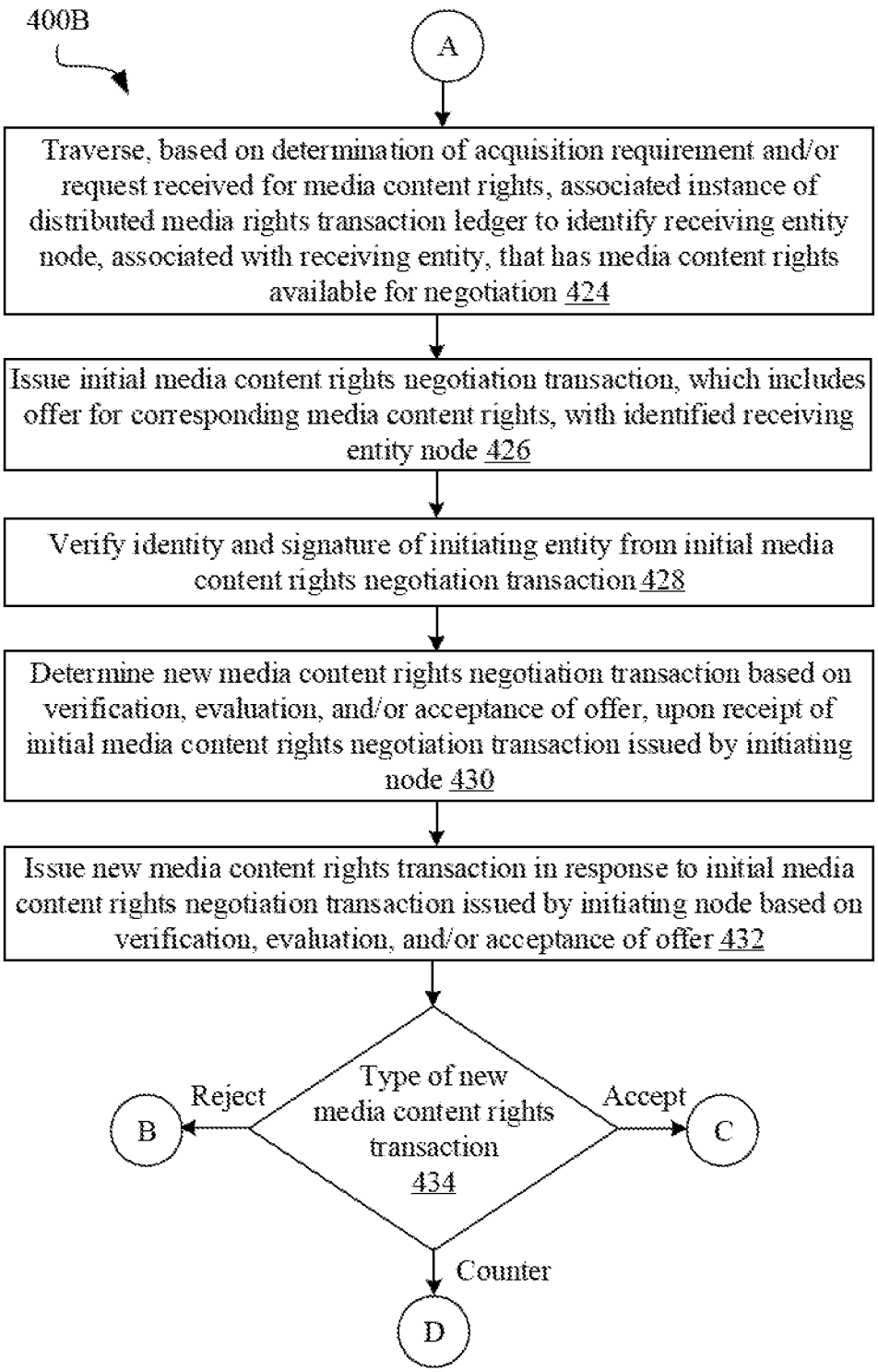
Figure 4C:
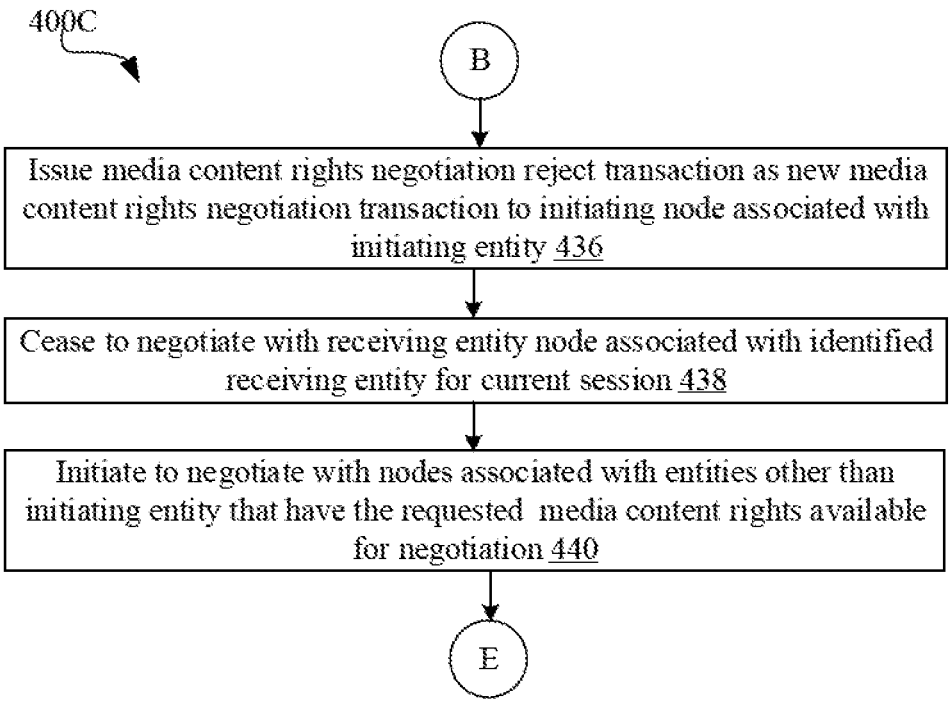

At 436 in flowchart 400C in FIG. 4C, a media content rights negotiation reject transaction may be issued as the new media content rights negotiation transaction to the initiating node 102a associated with the initiating entity. In accordance with an embodiment, the receiving entity node 102b or 102c associated with the identified receiving entity may be configured to issue the media content rights negotiation reject transaction as the new media content rights negotiation transaction to the initiating node 102a associated with the initiating entity.

At 438, a negotiation with the receiving entity node 102b or 102c associated with the identified receiving entity may cease for the current session. In accordance with an embodiment, based on the media content rights negotiation reject transaction issued by the receiving entity node 102b or 102c associated with the identified receiving entity, the initiating node 102a associated with the initiating entity may be configured to cease to negotiate with the receiving entity node 102b or 102c associated with the identified receiving entity for the current session.

At 440, a negotiation may be initiated with nodes associated with entities other than the initiating entity that have the requested the media content rights available for negotiation. In accordance with an embodiment, based on the media content rights negotiation reject transaction issued by the receiving entity node 102b or 102c associated with the identified receiving entity, the initiating node 102a associated with the initiating entity may be configured to initiate to negotiate with nodes associated with entities other than the initiating entity that have the requested media content rights available for negotiation. Control passes to 418 of flowchart 400A in FIG. 4A.

Figure 4D:
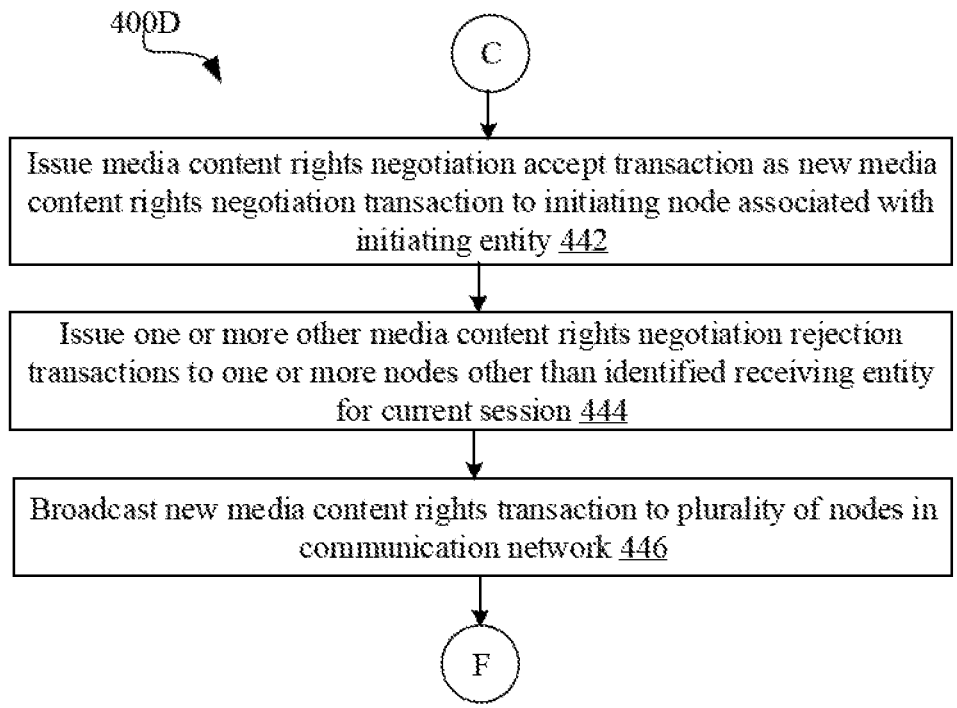

At 442 in flowchart 400D in FIG. 4D, a media content rights negotiation accept transaction may be issued as the new media content rights negotiation transaction to the initiating node 102a associated with the initiating entity. In accordance with an embodiment, the receiving entity node 102b or 102c associated with the identified receiving entity may be configured to issue the media content rights negotiation accept transaction as the new media content rights negotiation transaction to the initiating node 102a associated with the initiating entity.

At 444, one or more other media content rights negotiation rejection transactions may be issued to one or more nodes other than the identified receiving entity for the current session. In accordance with an embodiment, based on the media content rights negotiation accept transaction issued by the receiving entity node 102b or 102c associated with the identified receiving entity, the initiating node 102a associated with the initiating entity may be configured to issue one or more other media content rights negotiation rejection transactions to one or more nodes other than the identified receiving entity for current session. The initiating node associated with the initiating entity initiates to negotiate with the one or more other nodes that have the requested media content and the media content rights available for negotiation in parallel when the identified receiving entity rejects the offer for the corresponding media content rights.

At 446, the new media content rights negotiation transaction may be broadcasted to the plurality of nodes 102a, . . . , 102n in the communication network 106. In accordance with an embodiment, based on the media content rights negotiation accept transaction, the receiving entity node 102b or 102c associated with the identified receiving entity may be further configured to broadcast the new media content rights negotiation transaction to the plurality of nodes 102a, . . . , 102n in the communication network 106. The new media content rights negotiation transaction may comprise at least an encrypted summary of exchange of one or more other new media content rights negotiation transactions issued between nodes associated with the initiating entity and the receiving entity node 102b or 102c associated with the receiving entity prior to the new media content rights negotiation transaction, such that the summary can be decrypted by the initiating node 102a associated with the initiating entity and the receiving entity node 102b or 102c associated with the identified receiving entity. Control passes back to 420 of flowchart 400A in FIG. 4A.

Figure 4E:
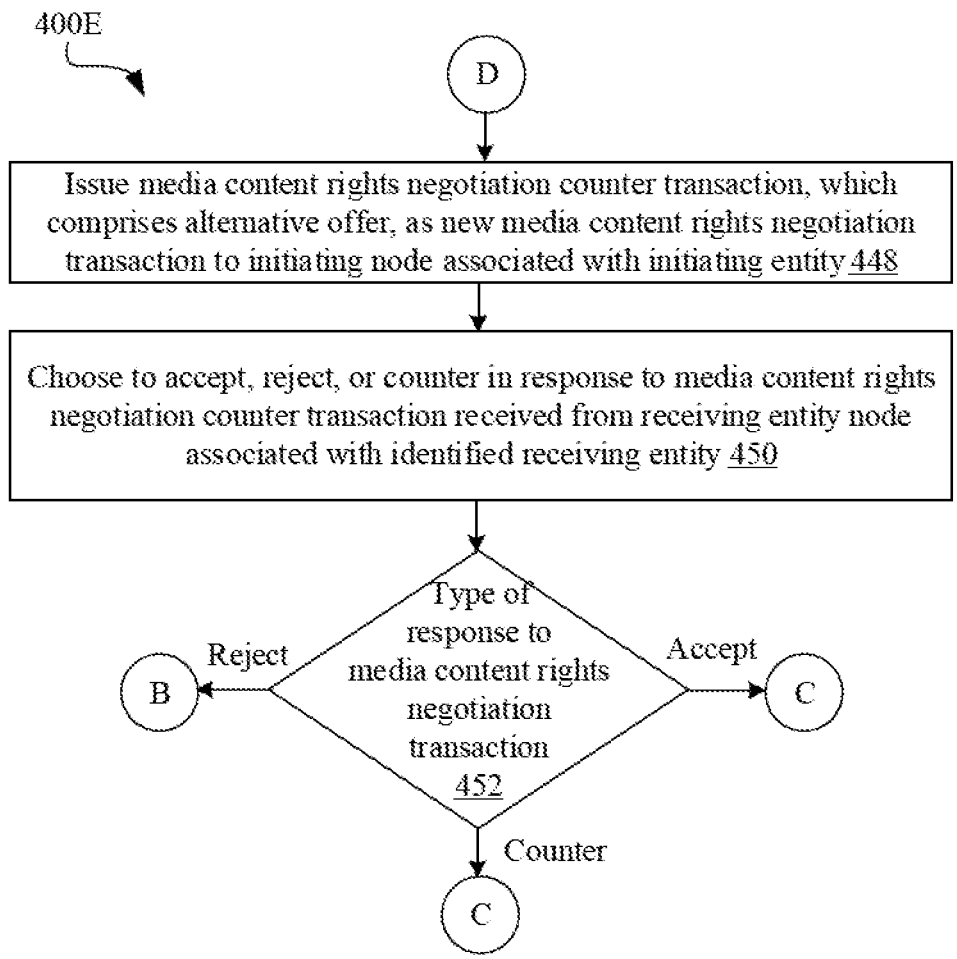

At 448 in flowchart 400E in FIG. 4E, a media content rights negotiation counter transaction, which comprises an alternative offer, may be issued as the new media content rights negotiation transaction to the initiating node 102a associated with the initiating entity. In accordance with an embodiment, the receiving entity node 102b or 102c associated with the identified receiving entity may be further configured to issue the media content rights negotiation counter transaction, which comprises the alternative offer, as the new media content rights negotiation transaction to initiating node 102a associated with the initiating entity. The receiving entity node 102b or 102c associated with the identified receiving entity may be further configured to counter the offer for the corresponding media content rights for an alternative offer. The alternative offer may comprise at least supplemental media content rights, monetary value, a trade for existing media content rights, and/or statistical data.

At 450, an acceptance, rejection, or counter may be chosen in response to the media content rights negotiation counter transaction received from the receiving entity node 102b or 102c associated with the identified receiving entity. In accordance with an embodiment, initiating node 102a associated with the initiating entity may be configured to choose to accept, reject, or counter in response to the media content rights negotiation counter transaction received from the receiving entity node 102b or 102c associated with the identified receiving entity.

At 452, a type of the response to the media content rights negotiation transaction may be determined. In accordance with an embodiment, when the initiating entity associated with the initiating node 102a determines the type of the new media content rights negotiation transaction to be a media content rights negotiation reject transaction, control passes to 436 in flowchart 400C in FIG. 4C. In accordance with another embodiment, when the initiating entity associated with the initiating node 102a determines the type of the new media content rights negotiation transaction to be a media content rights negotiation accept transaction, control passes to 442 in flowchart 400D in FIG. 4D. In accordance with yet another embodiment, when the initiating entity associated with the initiating node 102a determines the type of the new media content rights negotiation transaction to be a media content rights negotiation counter transaction, control passes to 448 in flowchart 400E in FIG. 4E.

At 420 in flowchart 400A in FIG. 4A, the plurality of media content rights negotiation transactions may be stored in corresponding instances of the distributed media rights transaction ledger 104 maintained by each node within the communication network 106 for validation and synchronization. In accordance with an embodiment, the plurality of media content rights negotiation transactions may be appended and stored in corresponding instances of the distributed media rights transaction ledger 104 maintained by each node of the plurality of nodes 102a, ..., 102n within the communication network 106 for validation and synchronization. Therefore, each instance of the distributed media rights transaction ledger 104 includes at least the initial media content rights negotiation transaction and the new media content rights negotiation transaction.

Accordingly, each instance of the distributed media rights transaction ledger 104 may include the plurality of media content rights negotiation transactions categorized and defined based on the defined protocol. In accordance with an embodiment, the one or more nodes of the plurality of nodes 102a, ..., 102n associated with the plurality of participants 108a, ..., 108n and 110a, ..., 110n may be configured to store the plurality of media content rights negotiation transactions in corresponding instances of the distributed media rights transaction ledger 104 maintained by each node of the plurality of nodes 102a, ..., 102n within the communication network 106 for validation and synchronization. In this regard, each node may append its own media content rights negotiation transactions as well as media content rights negotiation transactions from other nodes in its own instance of the distributed media rights transaction ledger 104.

In accordance with various embodiments, the distributed media rights transaction ledger 104 may be configured to maintain, across the plurality of participants 108a, ..., 108n and 110a, ..., 110n, a validated state of the one or more media content rights granted. The distributed media rights transaction ledger 104 may maintain a secured and validated historical record of consumption of the media content by the plurality of content consumers 110a, ..., 110n, and maintain secured and validated identities of the plurality of participants 108a, ..., 108n and 110a, ..., 110n. The distributed media rights transaction ledger 104 may further maintain a history of constraints for acquisition, distribution, consumption, and transfer of ownership of the one or more media content rights. The distributed media rights transaction ledger 104 may further maintain a history of negotiations via a sequence of media content rights negotiation transactions which occur between at least two participants of the plurality of participants 108a, ..., 108n and 110a, ..., 110n.

In accordance with an embodiment, data for the plurality of media content rights negotiation transactions for the distributed media rights transaction ledger 104 may be synchronized across the plurality of nodes 102a, ..., 102n in the communication network 106. Thus, the distributed media rights transaction ledger 104 may be secured to ensure integrity of data shared across the plurality of nodes 102a, ..., 102n. In accordance with an embodiment, the at least one node of the plurality of nodes 102a, ..., 102n may be further configured to maintain a corresponding instance of the distributed media rights transaction ledger 104 and communicate the corresponding instance of the distributed media rights transaction ledger 104 to the one or more remaining nodes upon request.

At 422, the media content rights may be provided to the first consumer device 114a based on the dynamically provided media content rights. In accordance with an embodiment, the initiating node 102a may be configured to provide the media content rights acquired from the receiving entity node 102b or 102c to the first consumer device 114a. In accordance with an embodiment, the media player of the first consumer device 114a may be provided a link of the media content from the media content master repository 322 of the second entity associated with the receiving entity node 102b to start viewing the media content based on the dynamically acquired media content rights.

Figure 5:
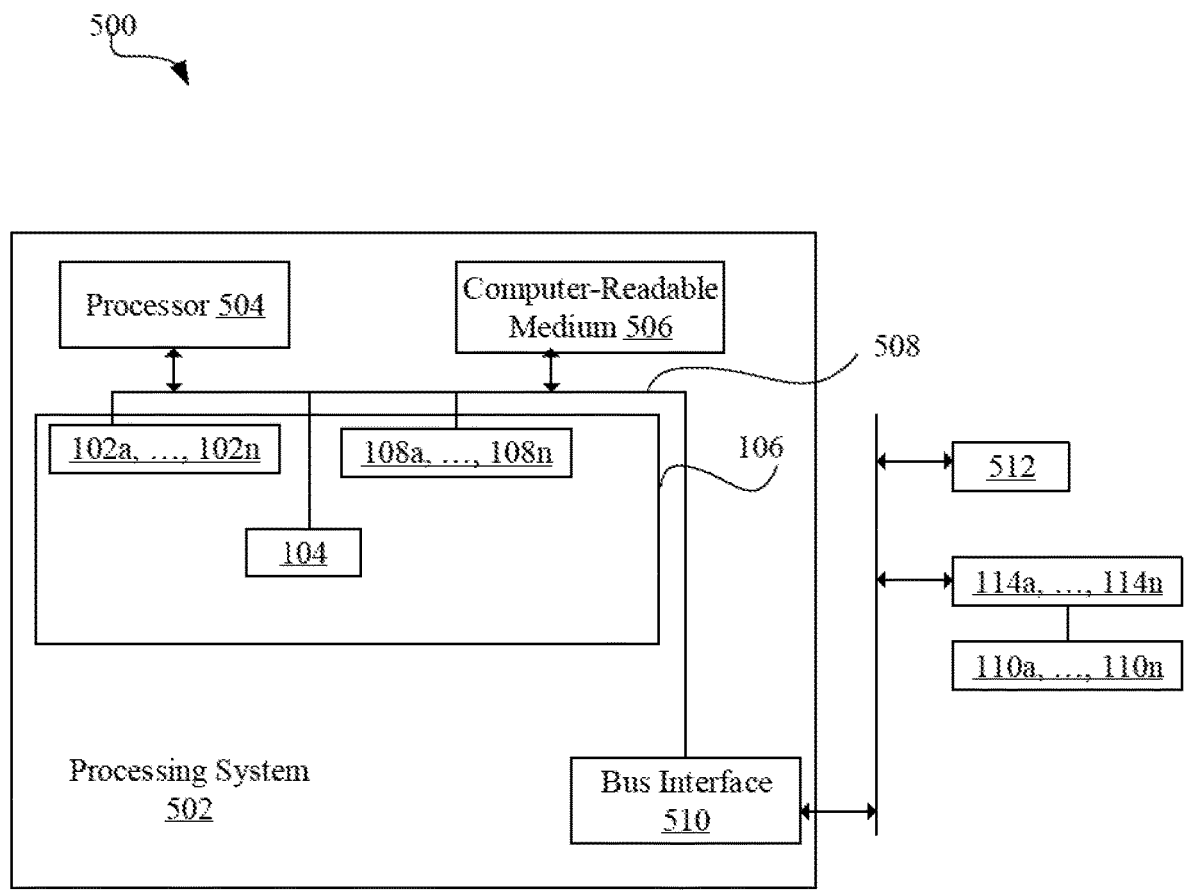
FIG. 5 is a conceptual diagram illustrating an example of a hardware implementation for a system employing a processing system for media content rights negotiation based on a protocol for management of media content rights using a distributed media rights transaction ledger, in accordance with an exemplary embodiment of the disclosure.

FIG. 5 is a conceptual diagram illustrating an example of a hardware implementation for a system employing a processing system for media content rights negotiation based on a protocol for management of media content rights using a distributed media rights transaction ledger, in accordance with an exemplary embodiment of the disclosure. Referring to FIG. 5, the hardware implementation shown by a representation 500 for the ecosystem 100 employs a processing system 502 for media content rights negotiation based on a protocol for management of media content rights using a distributed media rights transaction ledger, in accordance with an exemplary embodiment of the disclosure, as described herein.

In some examples, the processing system 502 may comprise one or more hardware processors 504, a non-transitory computer-readable medium 506, a bus 508, a bus interface 510, and a transceiver 512. FIG. 5 further illustrates the plurality of nodes 102a, ..., 102n, the distributed media rights transaction ledger 104, the plurality of entities 108a, ..., 108n, and the plurality of media content rights negotiation transactions, as described in detail in FIG. 1.

The hardware processor 504 may be configured to manage the bus 508 and general processing, including the execution of a set of instructions stored on the non-transitory computer-readable medium 506. The set of instructions, when executed by the hardware processor 504, causes the ecosystem 100 to execute the various functions described herein for any particular apparatus. The hardware processor 504 may be implemented, based on a number of processor technologies known in the art. Examples of the hardware processor 504 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 506 may be used for storing data that is manipulated by the hardware processor 504 when executing the set of instructions. The data is stored for short periods or in the presence of power. The non-transitory computer-readable medium 506 may also be configured to store data for the plurality of nodes 102a, ..., 102n, the distributed media rights transaction ledger 104, the plurality of entities 108a, ..., 108n, and the plurality of media content rights negotiation transactions.

The bus 508 is configured to link together various circuits. In this example, the ecosystem 100 employing the processing system 502 and the non-transitory computer-readable medium 506 may be implemented with bus architecture, represented generally by bus 508. The bus 508 may include any number of interconnecting buses and bridges depending on the specific implementation of the ecosystem 100 and the overall design constraints. The bus interface 510 may be configured to provide an interface between the bus 508 and other circuits, such as, transceiver 512, and external devices, such as the plurality of consumer devices 114a, ..., 114n associated with respective content consumers of the plurality of content consumers 110a, ..., 110n.

The transceiver 512 may be configured to provide a communication of the communication network 106 with various other apparatus, such as the plurality of consumer devices 114a, ..., 114n associated with respective content consumers of the plurality of content consumers 110a, ..., 110n, via the network 116. The transceiver 512 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.1 in), voice over Internet Protocol (VoIP), and/or Wi-MAX.

It should be recognized that, in some embodiments of the disclosure, one or more components of FIG. 5 may include software whose corresponding code may be executed by at least one processor, for across multiple processing environments. For example, the plurality of nodes 102a, . . . , 102n, the distributed media rights transaction ledger 104, the plurality of entities 108a, . . . , 108n, and the plurality of media content rights negotiation transactions, may include software that may be executed across a single or multiple processing environments.

In an aspect of the disclosure, the hardware processor 504, the non-transitory computer-readable medium 506, or a combination of both may be configured or otherwise specially programmed to execute the operations or functionality of the plurality of nodes 102a, . . . , 102n, the distributed media rights transaction ledger 104, the plurality of entities 108a, . . . , 108n, and the plurality of media content rights negotiation transactions, or various other components described herein, as described with respect to FIGS. 1 to 4E.

Various embodiments of the disclosure comprise the ecosystem 100 for media content rights negotiation based on a protocol for management of media content rights using the distributed media rights transaction ledger 104. In an embodiment, the ecosystem 100 may comprise a plurality of nodes 102a, . . . , 102n configured to interact with each other in accordance with a defined protocol in the communication network 106. An initiating node 102a of the plurality of nodes 102a, . . . , 102n, associated with an initiating entity, may be configured to determine an acquisition requirement and/or receive request on behalf of other participant for media content rights of a requested media content. Based on the determination of the acquisition requirement and/or the received request for the media content rights, an associated instance of the distributed media rights transaction ledger 104 may be traversed to identify the receiving entity node 102b or 102c, associated with a receiving entity, that have the media content rights available for negotiation. Accordingly, the initiating entity associated with the initiating node 102a may be configured to issue an initial media content rights negotiation transaction, which includes an offer for corresponding media content rights, with the identified receiving entity node 102b or 102c. The identified receiving entity node 102b or 102c may be configured to verify an identity and signature of the initiating entity from the initial media content rights negotiation transaction. The identified receiving entity node 102b or 102c may be further configured to issue a new media content rights negotiation transaction in response to the initial media content rights negotiation transaction issued by the initiating node 102a based on the verification, evaluation, and/or acceptance of the offer. A plurality of instances of the distributed media rights transaction ledger 104 may be associated with a respective node of the plurality of nodes 102a, . . . , 102n. Each instance of the distributed media rights transaction ledger 104 may include at least the initial media content rights negotiation transaction and the new media content rights negotiation transaction.

In accordance with an embodiment, the determination of the acquisition requirement and/or the received request for the media content rights may be based on information associated with consumption history of a content consumer, for example the first content consumer 110a, or a group of content consumers, such as the plurality of content consumers 110a, . . . , 110n. The consumption history may be retrieved from the associated instance of the distributed media rights transaction ledger 104.

In accordance with an embodiment, the determination of the acquisition requirement and/or the received request for the media content rights may be based on information associated with historical media content rights acquisition pricing for a content consumer, for example the first content consumer 110a, or a group of content consumers, such as the plurality of content consumers 110a, . . . , 110n. The information associated with historical content rights acquisition pricing may be retrieved from the associated instance of the distributed media rights transaction ledger 104.

In accordance with an embodiment, the determination of the acquisition requirement and/or the received request for the media content rights may be based on information associated with historical media content rights acquisition pricing for an entity or entities. The information associated with the historical media content rights acquisition pricing for the entity or entities may be retrieved from the associated instance of the distributed media rights transaction ledger.

In accordance with an embodiment, the determination of the acquisition requirement and/or the received request for the media content rights may be based on a playback request for the media content received from at least a subscribed participant associated with a consumer device, such as the first content consumer 110a, or a presence of the media content in a programming schedule of the initiating node 102a. The consumer device, such as the first content consumer 110a, may be communicably coupled to the initiating node 102a in the communication network 106.

In accordance with an embodiment, the determination of the acquisition requirement and/or the received request for the media content rights may be based on a statistical analysis of a content consumer, for example the first content consumer 110a, or a group of content consumers, such as the plurality of content consumers 110a, . . . , 110n, consumption habits of the content consumer, for example the first content consumer 110a, or a group of content consumers, such as the plurality of content consumers 110a, . . . , 110n, and/or historical pricing for at least the content consumers and/or a plurality of initiating and receiving entities.

In accordance with an embodiment, the determination of the acquisition requirement and/or the received request for the media content rights may be based on a predictive model to anticipate demand for the requested media content. The anticipated demand for the media content may be based on one or more criteria. The one or more criteria may comprise at least a significant world event, a popularity change of a public figure, a popularity change of a subject matter, cultural influences, social and societal trends, demographics, and/or the release or future release of alternative or related media content.

In accordance with an embodiment, initial media content rights negotiation transaction further includes the identity of the initiating entity, an identity of at least the receiving entity, one or more attributes of the media content rights corresponding to the acquisition requirement and/or the received request for the requested media content, an identity of the requested media content, a transaction type of the initial media content rights negotiation transaction.

In accordance with an embodiment, the offer for the corresponding media content rights may be included in the initial media content rights negotiation transaction and one or more counter media rights negotiation transactions may be comprised of one or more of a monetary value, a trade for existing media content rights, and/or statistical data to be used for the evaluation of the offer by the identified receiving entity.

In accordance with an embodiment, the initial media content rights negotiation transaction and the one or more counter media rights negotiation transactions between the plurality of nodes 102a, ..., 102n associated with the initiating entity or the receiving entity is not broadcasted to remaining nodes of the plurality of nodes 102a, ..., 102n in the communication network 106.

In accordance with an embodiment, the initial media content rights negotiation transaction and the one or more counter media rights negotiation transactions between the plurality of nodes 102a, ..., 102n associated with the initiating entity or the receiving entity is re-broadcasted to defined nodes associated with the identified initiating or receiving entity to maintain synchronization.

In accordance with an embodiment, for the issuance of the new media content rights negotiation transaction, the receiving entity node 102b or 102c associated with the identified receiving entity may be configured to determine the new media content rights negotiation transaction based on the verification, evaluation, and/or acceptance of the offer, upon the receipt of the initial media content rights negotiation transaction issued by the initiating node 102a. The issued new media content rights negotiation transaction is one of a media content rights negotiation accept transaction, a media content rights negotiation reject transaction, or a media content rights negotiation counter transaction.

In accordance with an embodiment, the receiving entity node 102b or 102c associated with the identified receiving entity may be further configured to reject the offer for the corresponding media content rights and issue the media content rights negotiation reject transaction as the new media content rights negotiation transaction to the initiating node associated with the initiating entity.

In accordance with an embodiment, based on the media content rights negotiation reject transaction issued by the receiving entity node 102b or 102c associated with the identified receiving entity, the initiating node 102a associated with the initiating entity is further configured to cease to negotiate with the receiving entity node 102b or 102c associated with the identified receiving entity for current session and initiate to negotiate with nodes, such as 102d, associated with entities other than the initiating entity that have requested media content rights available for negotiation.

In accordance with an embodiment, the receiving entity node 102b or 102c associated with the identified receiving entity is further configured to accept the offer for the corresponding media content rights and issue the media content rights negotiation accept transaction as the new media content rights negotiation transaction to the initiating node 102a associated with the initiating entity.

In accordance with an embodiment, based on the media content rights negotiation accept transaction issued by the receiving entity node 102b or 102c associated with the identified receiving entity, the initiating node 102a associated with the initiating entity may be further configured to issue one or more other media content rights negotiation rejection transactions to one or more nodes other than the identified receiving entity for current session. The initiating node associated with the initiating entity is configured to initiate to negotiate with the one or more other nodes that have the requested media content and the media content rights available for negotiation in parallel when the identified receiving entity rejects the offer for the corresponding media content rights.

In accordance with an embodiment, based on the media content rights negotiation accept transaction, the receiving entity node 102b or 102c associated with the identified receiving entity may be further configured to broadcast the new media content rights negotiation transaction to the plurality of nodes 102a, ..., 102n in the communication network 106. The new media content rights negotiation transaction comprises at least an encrypted summary of exchange of one or more other new media content rights negotiation transactions issued between nodes associated with the initiating entity and the receiving entity node associated with the receiving entity prior to the new media content rights negotiation transaction, such that the summary can be decrypted by initiating node 102a associated with the initiating entity and the receiving entity node 102b or 102c associated with the identified receiving entity.

In accordance with an embodiment, the new media content rights negotiation transaction is appended to the plurality of instances of the distributed media rights transaction ledger 104 associated with respective node of the plurality of nodes 102a, ..., 102n.

In accordance with an embodiment, the receiving entity node 102b or 102c associated with the identified receiving entity is further configured to counter the offer for the corresponding media content rights for an alternative offer. The alternative offer may comprise at least supplemental media content rights, monetary value, a trade for existing media content rights, and/or statistical data. Accordingly, the media content rights negotiation counter transaction may issue, which comprises the alternative offer, as the new media content rights negotiation transaction to initiating node associated with the initiating entity.

In accordance with an embodiment, based on the media content rights negotiation counter transaction, the initiating entity associated with the initiating entity may be further configured to choose to accept, reject, or counter in response to the media content rights negotiation counter transaction received from the receiving entity node associated with the identified receiving entity.

In accordance with an embodiment, the initiating node 102a associated with the initiating entity may correspond to a gateway between one or more consumer devices and the communication network 106, and the receiving entity node associated with the receiving entity corresponds to a content owner or a content distributor.

Various embodiments of the disclosure may provide a computer-readable medium, such as the non-transitory computer-readable medium 506, having stored thereon, computer-implemented instruction that when executed by the processor 504 causes the ecosystem 100 for media content rights negotiation based on a protocol for management of media content rights using the distributed media rights transaction ledger 104. In accordance with an embodiment, the processor 504 causes the ecosystem 100 to execute operations to a configure the plurality of nodes 102a, ..., 102n configured to interact with each other in accordance with a defined protocol in the communication network 106.

An initiating node 102a of the plurality of nodes 102a, ..., 102n, associated with an initiating entity, may be configured to determine an acquisition requirement and/or receive request on behalf of other participant for media content rights of a requested media content. Based on the determination of the acquisition requirement and/or the received request for the media content rights, an associated instance of the distributed media rights transaction ledger 104 may be traversed to identify the receiving entity node 102b or 102c, associated with a receiving entity, that have the media content rights available for negotiation. Accordingly, the initiating entity associated with the initiating node 102a may be configured to issue an initial media content rights negotiation transaction, which includes an offer for corresponding media content rights, with the identified receiving entity node 102b or 102c. The identified receiving entity node 102b or 102c may be configured to verify an identity and signature of the initiating entity from the initial media content rights negotiation transaction. The identified receiving entity node 102b or 102c may be further configured to issue a new media content rights negotiation transaction in response to the initial media content rights negotiation transaction issued by the initiating node 102a based on the verification, evaluation, and/or acceptance of the offer. A plurality of instances of the distributed media rights transaction ledger 104 may be associated with a respective node of the plurality of nodes 102a, ..., 102n. Each instance of the distributed media rights transaction ledger 104 may include at least the initial media content rights negotiation transaction and the new media content rights negotiation transaction.

Managing the media content rights of millions of media assets, by thousands of content owners, content distributors, and tracking a flow of content rights from one entity to other entity, in a secure manner is a herculean task. Currently, media content rights clearance and negotiations are very time consuming, and backed by readily accessible/usable data. Further, multiple content libraries by various entities, require separate subscriptions and make it difficult for users to navigate to content of their choice freely without having individual subscription. Further, third party measurement of viewership of a content item, are costly. There is no mechanism to precisely track content rights and royalties for various entities. Further, isolated content catalogs and third-party dependencies to estimate viewership for a content item, such as a TV show, to plan for future advertisement inventory needs and obligations, increase complexities. This in turn increases re-work and requires installation of large infrastructures and resources to maintain uninterrupted content delivery for existing channel and limits the ability of the broadcast or network provider to change content, provide customized content in real time or near-real time. Existing systems have been largely ignored by the industry short of a basic "allow/reject" playback of media content.

The disclosed system and method for dynamic acquisition, re-distribution, enforcement, and tracking of content rights of media content, has several advantages, for example, a) Providing tokenized and secure content licenses for a media content; b) Ease-of-use and sharing of catalogs, revenue, content rights makes pirating unjustified; c) content distributors are able to dynamically acquire rights from content owners and pass on the rights to the consumers in real time or near real-time; d) instant user-targeted catalogs may be identified and prepared and pushed to apps, such as a mobile app or a TV app, at consumer devices; e) the ecosystem provides a platform for creation of a marketplace where new media markets, such as a content trading market may emerge; f) content development is user-driven/user-funded; g) digital currency, for example, digital cryptocurrencies, may be used easily in network due to the inherent framework of network; h) enables instant settlements using the distributed media rights transaction ledger; and i) simplified, secured, real time, ensured, and fail-safe tracking of media content rights among various participants of the ecosystem 100. Thus, the disclosed new and advanced ecosystem provide dynamic and on-the-fly media content rights negotiation transactions for media content rights and contractual obligations to provide new and customized media content offerings in a cost-effective manner and enhanced viewer experience to reinvigorate the digital media and television content broadcasting industry As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made, and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
a plurality of processors, wherein the plurality of processors comprises a plurality of nodes,
   wherein a first node of the plurality of nodes is configured to interact with a second node of the plurality of nodes based on a defined protocol in a communication network,
   wherein an initiating node of the plurality of nodes, associated with an initiating entity, is configured to:
      determine an acquisition requirement and/or a receive request on behalf of other participant for media content rights of a requested media content;
      traverse an associated instance of a distributed media rights transaction ledger based on the determination of the acquisition requirement and/or the receive request for the media content rights;
      identify a receiving entity node based on traversal of a plurality of transaction types of each mutual negotiation between each of the plurality of nodes over the media content rights in the distributed media rights transaction ledger,
      wherein the receiving entity node is associated with a receiving entity, that has the media content rights available for negotiation; and
      issue an initial media content rights negotiation transaction, which includes an offer for corresponding media content rights, with the identified receiving entity node;
   wherein the identified receiving entity node is configured to:
      verify an identity and signature of the initiating entity from the initial media content rights negotiation transaction;
      issue a new media content rights negotiation transaction in response to the initial media content rights negotiation transaction issued by the initiating node based on verification, evaluation, and/or acceptance of the offer; and
   a plurality of storage devices, wherein a storage device of the plurality of storage devices is configured to store at least the initial media content rights negotiation transaction and the new media content rights negotiation transaction in an instance of a plurality of instances of the distributed media rights transaction ledger associated with a respective node of the plurality of nodes.

2. The system of claim 1, wherein the determination of the acquisition requirement and/or the receive request for the media content rights is based on information associated with consumption history of a content consumer or a group of content consumers, and
   wherein the consumption history is retrieved from the associated instance of the distributed media rights transaction ledger.

3. The system of claim 1, wherein the determination of the acquisition requirement and/or the receive request for the media content rights is based on information associated with historical media content rights acquisition pricing for a content consumer or a group of content consumers, and
   wherein the information associated with historical content rights acquisition pricing is retrieved from the associated instance of the distributed media rights transaction ledger.

4. The system of claim 1, wherein the determination of the acquisition requirement and/or the receive request for the media content rights is based on information associated with historical media content rights acquisition pricing for an entity or entities, and
   wherein the information associated with the historical media content rights acquisition pricing for the entity or entities is retrieved from the associated instance of the distributed media rights transaction ledger.

5. The system of claim 1, wherein the determination of the acquisition requirement and/or the receive request for the media content rights is based on a playback request for the media content received from at least a subscribed participant associated with a consumer device or a presence of the media content in a programming schedule of the initiating node, and
   wherein the consumer device is communicably coupled to the initiating node in the communication network.

6. The system of claim 1, wherein the determination of the acquisition requirement and/or the receive request for the media content rights is based on a statistical analysis of a content consumer or consumers, consumption habits of the content consumer or consumers, and/or historical pricing for at least the content consumers and/or a plurality of initiating and receiving entities.

7. The system of claim 1, wherein the determination of the acquisition requirement and/or the receive request for the media content rights is based on a predictive model to anticipate demand for the requested media content,
   wherein the anticipated demand for the media content is based on one or more criteria, and
   wherein the one or more criteria comprises at least a significant world event, a popularity change of a public figure, a popularity change of a subject matter, cultural influences, social and societal trends, demographics, and/or the release or future release of alternative or related media content.

8. The system of claim 1, wherein the initial media content rights negotiation transaction further includes the identity of the initiating entity, an identity of at least the receiving entity, one or more attributes of the media content rights corresponding to the acquisition requirement and/or the receive request for the requested media content, an identity of the requested media content, or a transaction type of the initial media content rights negotiation transaction.

9. The system of claim 1, wherein the offer for the corresponding media content rights included in the initial media content rights negotiation transaction and one or more counter media rights negotiation transactions is comprised of one or more of a monetary value, a trade for existing media content rights, and/or statistical data to be used for the evaluation of the offer by the identified receiving entity.

10. The system of claim 9, wherein the initial media content rights negotiation transaction and the one or more counter media rights negotiation transactions between the plurality of nodes associated with the initiating entity or the receiving entity is not broadcasted to remaining nodes of the plurality of nodes in the communication network.

11. The system of claim 10, wherein the initial media content rights negotiation transaction and the one or more counter media rights negotiation transactions between the plurality of nodes associated with the initiating entity or the receiving entity is re-broadcasted to defined nodes associated with the identified initiating or receiving entity to maintain synchronization.

12. The system of claim 1, wherein, for the issuance of the new media content rights negotiation transaction, the receiving entity node associated with the identified receiving entity is configured to determine the new media content rights negotiation transaction based on the verification, evaluation, and/or acceptance of the offer, upon the receipt of the initial media content rights negotiation transaction issued by the initiating node, and
   wherein the issued new media content rights negotiation transaction is one of a media content rights negotiation accept transaction, a media content rights negotiation reject transaction, or a media content rights negotiation counter transaction.

13. The system of claim 12, wherein the receiving entity node associated with the identified receiving entity is further configured to:
   reject the offer for the corresponding media content rights; and
   issue the media content rights negotiation reject transaction as the new media content rights negotiation transaction to the initiating node associated with the initiating entity.

14. The system of claim 13, wherein, based on the media content rights negotiation reject transaction issued by the receiving entity node associated with the identified receiving entity, the initiating node associated with the initiating entity is further configured to:
   cease to negotiate with the receiving entity node associated with the identified receiving entity for current session; and
   initiate to negotiate with nodes associated with entities other than the initiating entity that have requested media content rights available for negotiation.

15. The system of claim 12, wherein the receiving entity node associated with the identified receiving entity is further configured to:
   accept the offer for the corresponding media content rights; and
   issue the media content rights negotiation accept transaction as the new media content rights negotiation transaction to the initiating node associated with the initiating entity.

16. The system of claim 14, wherein, based on the media content rights negotiation accept transaction issued by the receiving entity node associated with the identified receiving entity, the initiating node associated with the initiating entity are further configured to:
   issue one or more other media content rights negotiation rejection transactions to one or more nodes other than the identified receiving entity for the current session, and
   wherein the initiating node associated with the initiating entity is configured to initiate to negotiate with the one or more other nodes that have the requested media content and the media content rights available for negotiation in parallel when the identified receiving entity rejects the offer for the corresponding media content rights.

17. The system of claim 15, wherein, based on the media content rights negotiation accept transaction, the receiving entity node associated with the identified receiving entity may be further configured to broadcast the new media content rights negotiation transaction to the plurality of nodes in the communication network, and
   wherein the new media content rights negotiation transaction comprises at least an encrypted summary of exchange of one or more other new media content rights negotiation transactions issued between nodes associated with the initiating entity and the receiving entity node associated with the receiving entity prior to the new media content rights negotiation transaction, such that the summary can be decrypted by the initiating node associated with the initiating entity and the receiving entity node associated with the identified receiving entity.

18. The system of claim 17, wherein the new media content rights negotiation transaction is appended to the plurality of instances of the distributed media rights transaction ledger associated with respective nodes of the plurality of nodes.

19. The system of claim 12, wherein the receiving entity node associated with the identified receiving entity is further configured to:
counter the offer for the corresponding media content rights for an alternative offer, and
wherein the alternative offer comprises at least supplemental media content rights, monetary value, a trade for existing media content rights, and/or statistical data; and
issue the media content rights negotiation counter transaction, which comprises the alternative offer, as the new media content rights negotiation transaction to initiating node associated with the initiating entity.

20. The system of claim 19, wherein based on the media content rights negotiation counter transaction, the initiating entity associated with the initiating entity may be further configured to choose to accept, reject, or counter in response to the media content rights negotiation counter transaction received from the receiving entity node associated with the identified receiving entity.

21. The system of claim 19, wherein the initiating node associated with the initiating entity corresponds to a gateway between one or more consumer devices and the communication network, and
wherein the receiving entity node associated with the receiving entity corresponds to a content owner or a content distributor.

22. A method, comprising:
determining, by an initiating node of a plurality of nodes, an acquisition requirement and/or a receive request on behalf of other participant for media content rights of a requested media content,
wherein the initiating node is associated with an initiating entity,
wherein a first node of the plurality of nodes is configured to interact with a second node of the plurality of nodes based on a defined protocol in a communication network, and
wherein an instance of a plurality of instances of a distributed media rights transaction ledger is associated with a respective node of the plurality of nodes;
traversing an associated instance of the distributed media rights transaction ledger based on the determination of the acquisition requirement and/or the receive request for the media content rights;
identifying a receiving entity node based on traversal of a plurality of transaction types of each mutual negotiation between each of the plurality of nodes over the media content rights in the distributed media rights transaction ledger,
wherein the receiving entity node is associated with a receiving entity, that has the media content rights available for negotiation; and
issuing, by the initiating node, an initial media content rights negotiation transaction, which includes an offer for corresponding media content rights, with the identified receiving entity node,
wherein the identified receiving entity node is configured to:
verify an identity and signature of the initiating entity from the initial media content rights negotiation transaction; and
issue a new media content rights negotiation transaction in response to the initial media content rights negotiation transaction issued by the initiating node based on verification, evaluation, and/or acceptance of the offer,
wherein each instance of the distributed media rights transaction ledger includes at least the initial media content rights negotiation transaction and the new media content rights negotiation transaction.

23. The method of claim 22, wherein the determination of the acquisition requirement and/or the receive request for the media content rights is based on information associated with consumption history of a content consumer or a group of content consumers, and
wherein the consumption history is retrieved from the associated instance of the distributed media rights transaction ledger.

24. The method of claim 22, wherein the determination of the acquisition requirement and/or the receive request for the media content rights is based on information associated with historical media content rights acquisition pricing for a content consumer or a group of content consumers, and
wherein the information associated with historical content rights acquisition pricing is retrieved from the associated instance of the distributed media rights transaction ledger.

25. The method of claim 22, wherein the determination of the acquisition requirement and/or the receive request for the media content rights is based on information associated with historical media content rights acquisition pricing for an entity or entities, and
wherein the information associated with the historical media content rights acquisition pricing for the entity or entities is retrieved from the associated instance of the distributed media rights transaction ledger.

26. The method of claim 22, wherein the determination of the acquisition requirement and/or the receive request for the media content rights is based on a playback request for the media content received from at least a subscribed participant associated with a consumer device or a presence of the media content in a programming schedule of the initiating node, and
wherein the consumer device is communicably coupled to the initiating node in the communication network.

27. The method of claim 22, wherein the determination of the acquisition requirement and/or the receive request for the media content rights is based on a statistical analysis of a content consumer or consumers, consumption habits of the content consumer or consumers, and/or historical pricing for at least the content consumers and/or a plurality of initiating and receiving entities.

28. The method of claim 22, wherein the determination of the acquisition requirement and/or the receive request for the media content rights is based on a predictive model to anticipate demand for the requested media content,
wherein the anticipated demand for the media content is based on one or more criteria, and
wherein the one or more criteria comprises at least a significant world event, a popularity change of a public figure, a popularity change of a subject matter, cultural influences, social and societal trends, demographics, and/or the release or future release of alternative or related media content.

29. The method of claim 22, wherein the initial media content rights negotiation transaction further includes the identity of the initiating entity, an identity of at least the receiving entity, one or more attributes of the media content rights corresponding to the acquisition requirement and/or the receive request for the requested media content rights, an identity of the requested media content, or a transaction type of the initial media content rights negotiation transaction.

30. The method of claim 22, wherein the offer for the corresponding media content rights included in the initial media content rights negotiation transaction and one or more counter media rights negotiation transactions is comprised of one or more of a monetary value, a trade for existing media content rights, and/or statistical data to be used for the evaluation of the offer by the identified receiving entity.

31. The method of claim 30, wherein the initial media content rights negotiation transaction and the one or more counter media rights negotiation transactions between the plurality of nodes associated with the initiating entity or the receiving entity is not broadcasted to remaining nodes of the plurality of nodes in the communication network.

32. The method of claim 31, wherein the initial media content rights negotiation transaction and the one or more counter media rights negotiation transactions between the plurality of nodes associated with the initiating entity or the receiving entity is re-broadcasted to defined nodes associated with the identified initiating or receiving entity to maintain synchronization.

33. The method of claim 22, further comprising determining, by the receiving entity node associated with the identified receiving entity, the new media content rights negotiation transaction based on the verification, evaluation, and/or acceptance of the offer, upon the receipt of the initial media content rights negotiation transaction issued by the initiating node, and
wherein the issued new media content rights negotiation transaction is one of a media content rights negotiation accept transaction, a media content rights negotiation reject transaction, or a media content rights negotiation counter transaction.

34. The method of claim 33, further comprising:
rejecting, by the receiving entity node associated with the identified receiving entity, the offer for the corresponding media content rights; and
issuing, by the receiving entity node associated with the identified receiving entity, the media content rights negotiation reject transaction as the new media content rights negotiation transaction to the initiating node associated with the initiating entity.

35. The method of claim 34, further comprising:
ceasing, by the initiating node associated with the initiating entity, to negotiate with the receiving entity node associated with the identified receiving entity for current session; and
initiating, by the initiating node associated with the initiating entity, to negotiate with nodes associated with entities other than the initiating entity that have requested media content rights available for negotiation.

36. The method of claim 33, further comprising:
accepting, by the receiving entity node associated with the identified receiving entity, the offer for the corresponding media content rights; and
issuing, by the receiving entity node associated with the identified receiving entity, the media content rights negotiation accept transaction as the new media content rights negotiation transaction to the initiating node associated with the initiating entity.

37. The method of claim 35, further comprising:
issuing, by the initiating node associated with the initiating entity, one or more other media content rights negotiation rejection transactions to one or more nodes other than the identified receiving entity for the current session; and
initiating, by the initiating node associated with the initiating entity, to negotiate with the one or more other nodes that have the requested media content and the media content rights available for negotiation in parallel when the identified receiving entity rejects the offer for the corresponding media content rights.

38. The method of claim 36, further comprising broadcasting, by the receiving entity node associated with the identified receiving entity, the new media content rights negotiation transaction to the plurality of nodes in the communication network, and
wherein the new media content rights negotiation transaction comprises at least an encrypted summary of exchange of one or more other new media content rights negotiation transactions issued between nodes associated with the initiating entity and the receiving entity node associated with the receiving entity prior to the new media content rights negotiation transaction, such that the summary can be decrypted by the initiating node associated with the initiating entity and the receiving entity node associated with the identified receiving entity.

39. The method of claim 38, wherein the new media content rights negotiation transaction is appended to the plurality of instances of the distributed media rights transaction ledger associated with respective nodes of the plurality of nodes.

40. The method of claim 33, further comprising:
countering, by the receiving entity node associated with the identified receiving entity, the offer for the corresponding media content rights for an alternative offer, wherein the alternative offer comprises at least supplemental media content rights, monetary value, a trade for existing media content rights, and/or statistical data; and
issuing, by the receiving entity node associated with the identified receiving entity, the media content rights negotiation counter transaction, which comprises the alternative offer, as the new media content rights negotiation transaction to initiating node associated with the initiating entity.

41. The method of claim 40, further comprising choosing, by the initiating entity associated with the initiating entity, to accept, reject, or counter in response to the media content rights negotiation counter transaction received from the receiving entity node associated with the identified receiving entity.

42. The method of claim 40, wherein the initiating node associated with the initiating entity corresponds to a gateway between one or more consumer devices and the communication network, and
wherein the receiving entity node associated with the receiving entity corresponds to a content owner or a content distributor.

43. A non-transitory computer-readable medium having stored thereon, computer implemented instruction that when executed by a processor in a computer, causes the computer to execute operations, the operations comprising:

in a communication network:
determining, by an initiating node of a plurality of nodes, an acquisition requirement and/or a receive request on behalf of other participant for media content rights of a requested media content,
wherein the initiating node is associated with an initiating entity,
wherein a first node of the plurality of nodes is configured to interact with a second node of the plurality of nodes based on a defined protocol in the communication network, and
wherein an instance of a plurality of instances of a distributed media rights transaction ledger is associated with a respective node of the plurality of nodes;
traversing, by the initiating node, an associated instance of the distributed media rights transaction ledger based on the determination of the request for the media content rights;
identifying a receiving entity node based on traversal of a plurality of transaction types of each mutual negotiation between each of the plurality of nodes over the media content rights in the distributed media rights transaction ledger,
wherein the receiving entity node is associated with a receiving entity, that has the media content rights available for negotiation; and
issuing, by the initiating node, an initial media content rights negotiation transaction, which includes an offer for corresponding media content rights, with the identified receiving entity node,
wherein the identified receiving entity node is configured to:
verify an identity and signature of the initiating entity from the initial media content rights negotiation transaction; and
issue a new media content rights negotiation transaction in response to the initial media content rights negotiation transaction issued by the initiating node based on verification, evaluation, and/or acceptance of the offer,
wherein each instance of the distributed media rights transaction ledger includes at least the initial media content rights negotiation transaction and the new media content rights negotiation transaction.

* * * * *